(12) United States Patent
Koo et al.

(10) Patent No.: US 8,711,932 B2
(45) Date of Patent: *Apr. 29, 2014

(54) METHOD AND APPARATUS FOR DECODING/ENCODING A VIDEO SIGNAL WITH INTER-VIEW REFERENCE PICTURE LIST CONSTRUCTION

(75) Inventors: Han Suh Koo, Seoul (KR); Yeon Kwan Koo, legal representative, Seoul (KR); Byeong Moon Jeon, Seoul (KR); Seung Wook Park, Seoul (KR); Yong Joon Jeon, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 333 days.

This patent is subject to a terminal disclaimer.

(21) Appl. No.: 12/588,471

(22) Filed: Oct. 16, 2009

(65) Prior Publication Data
US 2010/0111173 A1 May 6, 2010

Related U.S. Application Data

(63) Continuation of application No. 12/310,103, filed as application No. PCT/KR2007/004115 on Aug. 27, 2007, now Pat. No. 8,532,178.

(60) Provisional application No. 60/840,032, filed on Aug. 25, 2006, provisional application No. 60/842,152, filed on Sep. 5, 2006, provisional application No. 60/842,151, filed on Sep. 5, 2006, provisional application No. 60/869,867, filed on Dec. 13, 2006.

(51) Int. Cl.
*H04N 7/32* (2006.01)

(52) U.S. Cl.
USPC .................................... 375/240.12

(58) Field of Classification Search
USPC ........................................ 375/240.01, 240.12
IPC .......................................................... H04N 7/32
See application file for complete search history.

(56) References Cited

U.S. PATENT DOCUMENTS

| | | |
|---|---|---|
| 5,886,736 A | 3/1999 | Chen |
| 6,055,012 A | 4/2000 | Haskell et al. |

(Continued)

FOREIGN PATENT DOCUMENTS

| | | |
|---|---|---|
| CN | 1489765 | 4/2004 |
| EP | 0 652 678 | 5/1995 |

(Continued)

OTHER PUBLICATIONS

Mueller et al., "Multiview Coding using AVC," ISO/IEC/JTC1/SC29/WG11, MPEG2006/m12945, Bangkok, Thailand, Jan. 2006.

(Continued)

*Primary Examiner* — Jay Patel
*Assistant Examiner* — Yulin Sun
(74) *Attorney, Agent, or Firm* — Harness, Dickey & Pierce

(57) ABSTRACT

A method of decoding a video signal is disclosed. The present invention includes obtaining identification information indicating whether a coded picture of a current NAL unit is an inter-view picture group, obtaining interview reference information of the inter-view picture group, and constructing a reference picture list for inter-view prediction using the inter-view reference information according to the identification information, wherein the inter-view reference information includes view identification information of an inter-view reference picture.

10 Claims, 10 Drawing Sheets

(56) References Cited

U.S. PATENT DOCUMENTS

| | | | |
|---|---|---|---|
| 6,278,736 | B1 | 8/2001 | De Haan et al. |
| 6,441,844 | B1 | 8/2002 | Tatsuzawa |
| 6,782,053 | B1 | 8/2004 | Lainema |
| 6,804,301 | B2 | 10/2004 | Wu et al. |
| 7,088,772 | B2 | 8/2006 | Kim et al. |
| 7,489,342 | B2 | 2/2009 | Xin et al. |
| 7,671,894 | B2 | 3/2010 | Yea et al. |
| 7,710,462 | B2 | 5/2010 | Xin et al. |
| 7,728,877 | B2 | 6/2010 | Xin et al. |
| 7,817,865 | B2 | 10/2010 | Yang |
| 7,856,148 | B2 | 12/2010 | Yang |
| 7,903,737 | B2 | 3/2011 | Martinian et al. |
| 2002/0014269 | A1 | 2/2002 | Rossi et al. |
| 2002/0106191 | A1 | 8/2002 | Betz et al. |
| 2002/0146239 | A1 | 10/2002 | Hamasaka et al. |
| 2003/0043909 | A1 | 3/2003 | Akiyoshi et al. |
| 2003/0138043 | A1 | 7/2003 | Hannuksela |
| 2003/0202592 | A1 | 10/2003 | Sohn et al. |
| 2003/0202594 | A1 | 10/2003 | Lainema |
| 2004/0047415 | A1 | 3/2004 | Robert et al. |
| 2004/0120396 | A1 | 6/2004 | Yun et al. |
| 2006/0028489 | A1 | 2/2006 | Uyttendaele et al. |
| 2006/0083298 | A1* | 4/2006 | Wang et al. ............. 375/240.01 |
| 2006/0146141 | A1 | 7/2006 | Xin et al. |
| 2006/0146143 | A1 | 7/2006 | Xin et al. |
| 2006/0233247 | A1 | 10/2006 | Visharam et al. |
| 2006/0262856 | A1 | 11/2006 | Wu et al. |
| 2007/0064799 | A1 | 3/2007 | Ha |
| 2007/0081814 | A1 | 4/2007 | Ha et al. |
| 2007/0121722 | A1* | 5/2007 | Martinian et al. ....... 375/240.12 |
| 2008/0089412 | A1 | 4/2008 | Ugur et al. |
| 2008/0159638 | A1 | 7/2008 | Song et al. |
| 2009/0010323 | A1 | 1/2009 | Su et al. |
| 2009/0052529 | A1 | 2/2009 | Kim et al. |
| 2009/0116558 | A1 | 5/2009 | Chen et al. |
| 2009/0147850 | A1 | 6/2009 | Pandit |
| 2009/0168874 | A1* | 7/2009 | Su et al. .................. 375/240.12 |
| 2009/0185616 | A1 | 7/2009 | Pandit et al. |
| 2009/0225826 | A1 | 9/2009 | Pandit et al. |
| 2009/0304068 | A1 | 12/2009 | Pandit et al. |
| 2010/0322311 | A1 | 12/2010 | Vetro et al. |

FOREIGN PATENT DOCUMENTS

| | | |
|---|---|---|
| EP | 1784022 | 5/2007 |
| JP | 2007-159111 | 6/2007 |
| JP | 2007-259433 | 10/2007 |
| JP | 2008-022549 | 1/2008 |
| JP | 2008-503973 | 2/2008 |
| JP | 2008-172749 | 7/2008 |
| JP | 2008-182669 | 8/2008 |
| JP | 2009-531968 | 9/2009 |
| JP | 2010-507275 | 3/2010 |
| JP | 2010-507277 | 3/2010 |
| JP | 2010-507974 | 3/2010 |
| KR | 10-2002-0032954 | 5/2002 |
| KR | 10-2003-0069207 | 8/2003 |
| KR | 10-2004-0013540 | 2/2004 |
| KR | 10-2005-0122717 | 12/2005 |
| KR | 10-2006-0068254 A | 6/2006 |
| KR | 10-2006-0122663 A | 11/2006 |
| KR | 10-2006-0122684 A | 11/2006 |
| RU | 2005131939 | 3/2006 |
| TW | 200536377 | 11/2005 |
| TW | 200620994 | 6/2006 |
| WO | WO 01/10132 | 2/2001 |
| WO | WO 03/053066 | 6/2003 |
| WO | WO 03/058978 | 7/2003 |
| WO | WO 03/093928 | 11/2003 |
| WO | WO 2004/056125 | 7/2004 |
| WO | WO 2004/080078 | 9/2004 |
| WO | WO 2004/014060 | 12/2004 |
| WO | WO 2006-001653 | 1/2006 |
| WO | WO 2006/001653 | 1/2006 |
| WO | WO 2006-062377 | 6/2006 |
| WO | WO 2006/062377 | 6/2006 |

OTHER PUBLICATIONS

Search Report for corresponding European Application No. 07745744.8 dated May 7, 2010.

Jeong-Hyu Yang, Illumination Compensation Scheme for MVC based on Intra Offset Prediction, International Organisation for Standardisation Organisation International De Normalisation ISO/IEC JTC1/SC29/WG11 Coding of Moving Pictures and Audio, M1J361, Apr. 2006.

Office Action for Chinese Application No. 200780018827.3 dated Sep. 1, 2010.

International Search Report dated Dec. 21, 2007.

Office Action for corresponding U.S. Appl. No. 12/588,447 dated Jan. 17, 2012.

Office Action for corresponding U.S. Appl. No. 12/805,792 dated Feb. 22, 2012.

Office Action for corresponding U.S. Appl. No. 12/585,558 dated Feb. 22, 2012.

PCT/KR2007/004115 International Search Report dated Dec. 24, 2007.

Taiwan Office Action dated Dec. 27, 2010 issued in corresponding Taiwan Application No. 096122165 and English translation thereof.

Office Action for corresponding U.S. Appl. No. 12/308,369 dated Feb. 8, 2012.

Schafer, R. et al., "MCTF and Scalability Extension of H.264/AVC and its Application to Video Transmission, Storage, and Surveillance," Visual Communications and Image Processing 2005, Proceedings of the SPIE, vol. 5960, pp. 343-354 (2005).

Sun, S. et al., "Extended Spatial Scalability with Picture-Level Adaption," Joint Video Team (JVT) of ISO/IEC MPEG & ITU-T VCEG, 15$^{th}$ Meeting, Korea, pp. 1-20, Apr. 16-22, 2005.

Rathgen, T. et al., "Proposal for SVC File Format Specification," ISO/IEC JTC1/SC29/WG11 MPEG2005/M12345, Jul. 2005, Poland.

Russian Notice of Allowance dated Jan. 20, 2010.

Office Action for corresponding U.S. Appl. No. 12/604,718 dated Mar. 31, 2010.

Mueller et al., "Multiview Coding using AVC," Joint Video Team (JVT) of ISO/IEC MPEG & ITU-T VCEG (ISO/IEC JTC1/SC29/WG11 and ITU-T SG16 Q6), No. M12945, Jan. 11, 2006, XP030041614.

English Translation of Notice of Allowance for corresponding Korean Application No. 10-2009-7017177 dated Apr. 20, 2010.

J. Reichel et al., "Scalable Video Coding Working Draft 3," Joint Video Team (JVT) of ISO/IEC MPEG & ITU-T VCEG (ISO/IEC JTC1/SC29/WG11 and ITU-T SG16 Q6), No. JVT-P201, Jul. 29, 2005, XP030006150.

Jeong-Hyu Yang et al., "Illumination Compensation Scheme for MVC based on Intra Offset Prediction," Joint Video Team (JVT) of ISO/IEC MPEG & ITU-T VCEG (ISO/IEC JTC/SC29/WG11 and ITU-T SG16 Q6), No. M13361, Apr. 2006, XP030042030.

Jeong-Hyu Yang, "Results on CE2 in Multiview Video Coding," Joint Video Team (JVT) of ISO/IEC MPEG & ITU-T VCEG (ISO/IEC JTC/SC29/WG11 and ITU-T SG16 Q6), No. M13621, Jul. 12, 2006, XP030042290.

Joaquin Lopez et al., "Block-Based Illumination Compensation and Search Techniques for Multiview Video Coding," Proceedings of the Picture Coding Symposium, Dec. 15, 2004, pp. 1-6, XP002437841.

"Survey of Algorithms used for Multi-view Video Coding (MVC)," Joint Video Team (JVT) of ISO/IEC MPEG & ITU-T VCEG (ISO/IEC JTC1/SC29/WG11 and ITU-T SG16 Q6), No. N6909, Jan. 21, 2005, XP030013629.

H-S Koo et al., "MVC Motion Skip Mode," Joint Video Team (JVT) of ISO/IEC MPEG & ITU-T VCEG (ISO/IEC JTC/SC29/WG11 and ITU-T SG16 Q6), No. JVT-W081, Apr. 19, 2007, XP030007041.

Search Report for corresponding European Application No. 07745746.3 dated Jan. 8, 2010.

Search Report for corresponding European Application No. 07745745.5 dated Jan. 20, 2010.

(56) References Cited

OTHER PUBLICATIONS

Search Report for corresponding European Application No. 07746998.9 dated Jan. 20, 2010.
Taiwan Office Action dated Jan. 28, 2011 issued in corresponding Taiwan Application No. 096122161 and English translation thereof.
Emin Martinian et al., "V-Picture Syntax for Random Access in Multi-view Video Compression," Joint Video Team (JVT) of ISO/IEC MPEG & ITU-T VCEG (ISO/IEC JTC1/SC29/WG11 and ITU-T SG16 Q6), No. M13121, Mar. 23, 2006, xp030041790.
Emin Martinian et al., "Multiview Video Compression using V frames," Joint Video Team (JVT) of ISO/IEC MPEG & ITU-T VCEG (ISO/IEC JTC1/SC29/WG11 and ITU-T SG16 Q6), No. M12828, Jan. 11, 2006, xp030041497.
A. Ventro et al., "Joint Multiview Video Model (JFVM) 1 (Jun. 8, 2011)," Joint Video Team (JVT) of ISO/IEC MPEG & ITU-T VCEG (ISO/IEC JTC1/SC29/WG11 and ITU-T SG 16 Q6), No. JVT-T208, Aug. 17, 2006, XP03006640.
Kwanghoon Sohn et al., "H.264/avc-Compatible Multi-view Video Coding," Joint Video Team (JVT) of ISO-IEC MPEG & ITU-T VCEG (ISO/IEC JTC1/SC29/WG11 and ITU-T SG16 Q6), No. M12874, Jan. 12, 2006, XP030041543.
Sangheon Lee et al., "HR/LR Hybrid Structure for MVC," Joint Video Team (JVT) of ISO/IEC MPEG & ITU-T VCEG (ISO/IEC JTC1/SC29/WG11 and ITU-T SG16 Q6), No. M13357, Mar. 29, 2006, XP030042026.
Search Report for corresponding European Application No. 07745747.1 dated Jan. 8, 2010.
Search Report for corresponding European Application No. 07745743.0 dated Jan. 8, 2010.
Office Action for corresponding Taiwanese Application No. 096131964 dated Oct. 12, 2011.
Office Action for corresponding U.S. Appl. No. 12/225,688 dated Nov. 4, 2011.
PCT International Search Report dated Oct. 8, 2007 for correponding PCT Application No. PCT/KR2007/002964.
United States Final Office Action dated Jan. 5, 2010 for corresponding U.S. Appl. No. 12/604,718.
PCT International Search Report dated Aug. 6, 2007 for correponding PCT Application No. PCT/KR2007/001580.
US Office Action dated Mar. 29, 2012 for corresponding U.S. Appl. No. 12/805,745.
US Office Action dated May 8, 2012 for corresponding U.S. Appl. No. 12/225,732.
Office Action dated Jul. 3, 2012 for U.S. Appl. No. 12/225,728.
Office Action dated May 15, 2012 for U.S. Appl. No. 12/656,967.
Martinian, E., et al. "Extensions of H.264/AVC for Multiview Video Compression"—International Conference on Image Processing—Jun. 2006.
ITU-T Recommendation H.264—Advanced video coding for generic audiovisual services. May 2003. International Telecommunication Union.
Vetro A, et al. "Joint Draft 1.0 on Multiview Video Coding"—Joint Video Team (JVT) of ISO/IEC MPEG & ITU-T VCEG (ISO/IEC JTC1/SC29/WG11 and ITU-T SG16 Q.6); 21$^{st}$ Meeting: Hangzhou, China, Oct. 2006; JVT-U209.
Chen, Ying, et al. "MVC Reference Picture Management"—Joint Video Team (JVT) of ISO/IEC MPEG & ITU-T VCEG (ISO/IEC JTC1/SC29/WG11 and ITU-T SG16 Q.6); 21$^{st}$ Meeting: Hangzhou, China, Oct. 2006; JVT=U105.
Vetro, A et al. "Comments on MVC reference picture management"—Joint Video Team (JVT) of ISO/IEC MPEG & ITU-T VCEG (ISO/IEC JTC1/SC29/WG11 and ITU-T SG16 Q.6); 21$^{st}$ Meeting: Hangzhou, China Oct. 2006—JVT-U062.doc.
Vetro, A et al. "Comments on MVC reference picture management"—Joint Video Team (JVT) of ISO/IEC MPEG & ITU-T VCEG (ISO/IEC JTC1/SC29/WG11 and ITU-T SG16 Q.6); 21$^{st}$ Meeting: Hangzhou, China Oct. 2006—JVT-U062r1.doc.
Chen, Y et al. "On MVC reference picture list construction" Joint Video Team (JVT) of ISO/IEC MPEG & ITU-T VCEG (ISO/IEC JTC1/SC29/WG11 and ITU-T SG16 Q.6); 22nd Meeting: Marrakech, Morocco, Jan. 2007—JVT-U043.doc.
Pandit, P. et al "High Level Syntax changes for MVC"—Joint Video Team (JVT) of ISO/IEC MPEG & ITU-T VCEG (ISO/IEC JTC1/SC29/WG11 and ITU-T SG16 Q.6); 22nd Meeting: Marrakech, Morocco, Jan. 2006—JVT-U054.doc.
Pandit, P. et al "High Level Syntax changes for MVC"—Joint Video Team (JVT) of ISO/IEC MPEG & ITU-T VCEG (ISO/IEC JTC1/SC29/WG11 and ITU-T SG16 Q.6); 22nd Meeting: Marrakech, Morocco, Jan. 2006—JVT-U054r1.doc.
Pandit, P. et al. "On MVC High-Level Syntax for Picture Management"—Joint Video Team (JVT) of ISO/IEC MPEG & ITU-T VCEG (ISO/IEC JTC1/SC29/WG11 and ITU-T SG16 Q.6); 20th Meeting: Klagenfurt, Austria, Jul. 2006—JVT-T131.doc.
Chen, Y, et al. "On MCV reference picture marking"—Pandit, P. et al "High Level Syntax changes for MVC"—Joint Video Team (JVT) of ISO/IEC MPEG & ITU-T VCEG (ISO/IEC JTC1/SC29/WG11 and ITU-T SG16 Q.6); 22nd Meeting: Marrakech, Morocco, Jan. 2006—JVT-U044.doc.
wftp3.itu.int—/av-arch/jvt-site/2006_07_Klagenfurt/.
wftp3.itu.int—/av-arch/jvt-site/2006_10_Hangzhou/.
wftp3.itu.int—/av-arch/jvt-site/2007_01_Marrakech/.
Notice of Allowance for U.S. Appl. No. 12/308,369 dated Jul. 26, 2012.
Guo, X, et al. "Inter-View direct Mode for Multiview Video Coding"—IEEE Transactions on Circuits and Systems for Video Technology, vol. 16, No. 12, Dec. 2006.
Guo and Huang, et al. "Multiview Video Coding Based on Global Motion Model"—Department of Computer Science and Technology, Harbin Institute of Technology, Harbin, China; PCM 2004.
Notice of Allowance for corresponding U.S. Appl. No. 12/225,767 dated Jul. 10, 2012.
U.S. Office Action issued Dec. 3, 2013 in U.S. Appl. No. 12/588,068.
Korean Notice of Allowance issued Dec. 9, 2013 in Korean Application No. 10-2007-0129741.
G. Sullivan, et al., "The H.264/AVC Advanced Video Coding standard: Overview and Introduction to the Fidelity Range Extensions," *Applications of Digital Image Processing XXVII, Proc. of SPIE*, vol. 5558, pp. 454-474 (2004).
Sun, et al., "Stereo-View Video Coding Using H.264 Tools," *Image and Video Communications and Processing 2005, SPIE*, vol. 5685, pp. 177-184 (2005).
Lim, et al., "A multiview sequence CODEC with view scalability," *Signal Processing: Image Communication*, vol. 19, pp. 239-256 (2004).

\* cited by examiner

FIG. 7
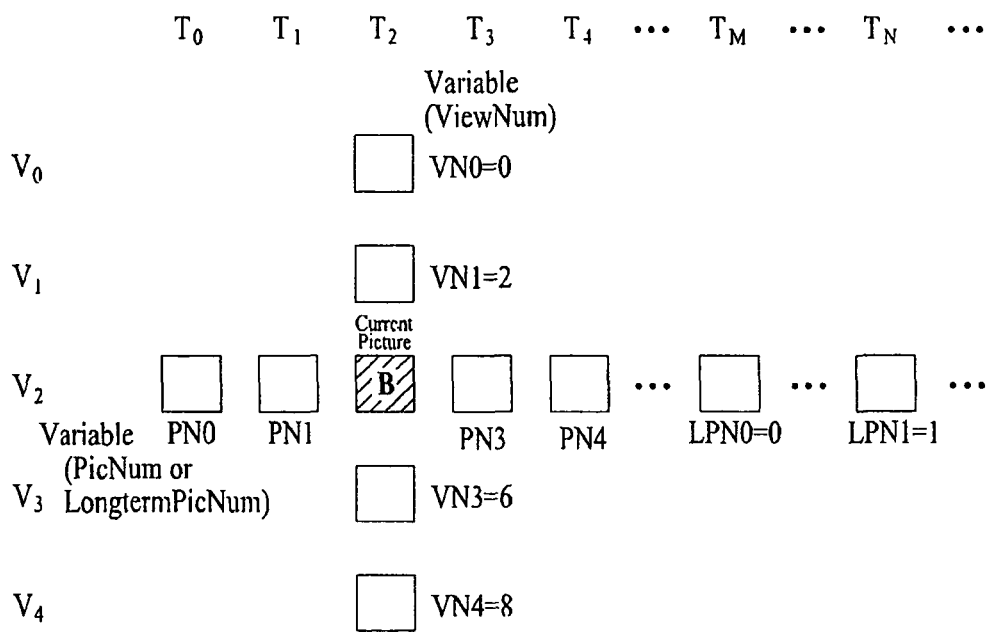
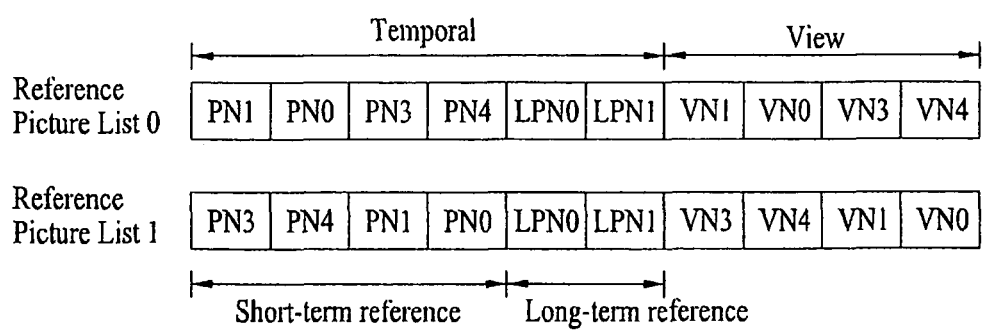

Reference picture list construction

METHOD AND APPARATUS FOR DECODING/ENCODING A VIDEO SIGNAL WITH INTER-VIEW REFERENCE PICTURE LIST CONSTRUCTION

CROSS-REFERENCE TO RELATED APPLICATIONS

This application is a continuation of U.S. application Ser. No. 12/310,103 filed Feb. 11, 2009, which claims priority from PCT International Application No. PCT/KR2007/0014115 filed on Aug. 27, 2009, which claims priority on U.S. provisional application Nos. 60/840,032; 60/842,152; 60/842,151; and 60/869,867 filed on Aug. 25, 2006, Sep. 5, 2006, Sep. 5, 2006 and Dec. 13, 2006. The entire contents of all of these applications are incorporated herein by reference.

TECHNICAL FIELD

The present invention relates to video signal coding.

BACKGROUND ART

Compression coding means a series of signal processing techniques for transmitting digitalized information via a communication circuit or storing the digitalized information in a form suitable for a storage medium. As targets of compression coding, there are audio, video, characters, etc. In particular, a technique for performing compression coding on video is called video sequence compression. A video sequence is generally characterized in having spatial redundancy or temporal redundancy.

DISCLOSURE OF THE INVENTION

Technical Problem

Accordingly, the present invention is directed to a method and apparatus for decoding/encoding a video signal that can substantially enhance efficiency in coding the video signal.

Technical Solution

Accordingly, the present invention is directed to a method and apparatus for decoding/encoding a video signal that substantially obviate one or more of the problems due to limitations and disadvantages of the related art.

An object of the present invention is to perform coding on a video signal efficiently by defining view information capable of identifying a view of picture.

Another object of the present invention is to efficiently perform coding on a video signal by defining an inter-view prediction flag indicating whether a coded picture of a current NAL unit is used for inter-view prediction.

Another object of the present invention is to efficiently perform coding on a video signal by constructing and managing a reference picture list using inter-view reference information indication an inter-view dependent relation.

Another object of the present invention is to efficiently perform an inter-view random access by obtaining inter-view reference information based on inter-view picture group identification information.

Another object of the present invention is to efficiently perform coding on a video signal by providing a method of managing reference pictures used for inter-view prediction.

Another object of the present invention is to efficiently perform coding on a video signal by providing a method of constructing a reference picture list for inter-view prediction.

A further object of the present invention is to efficiently perform coding on a video signal by providing a method of modifying a reference picture list for inter-view prediction.

Advantageous Effects

The present invention provides the following effects or advantages.

First of all, in coding a video signal, the present invention provides a method of managing reference pictures used for inter-view prediction, thereby enabling efficient coding.

Secondly, the present invention provides a method of initializing a reference picture list for inter-view prediction and a method of modifying a reference picture list for inter-view prediction, thereby enabling efficient coding.

Thirdly, in case that inter-view prediction is carried out by the present invention, a burden of a DPB (decoded picture buffer) is reduced. So, a coding rate can be enhanced and more accurate prediction is enabled to reduce the number of bits to be transported.

Fourthly, more efficient coding is enabled using various kinds of configuration informations on a multi-view sequence.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 is a diagram for a method of constructing a reference picture list when a current slice is a slice-B according to one embodiment of the present invention;

BEST MODE

Figure 1:
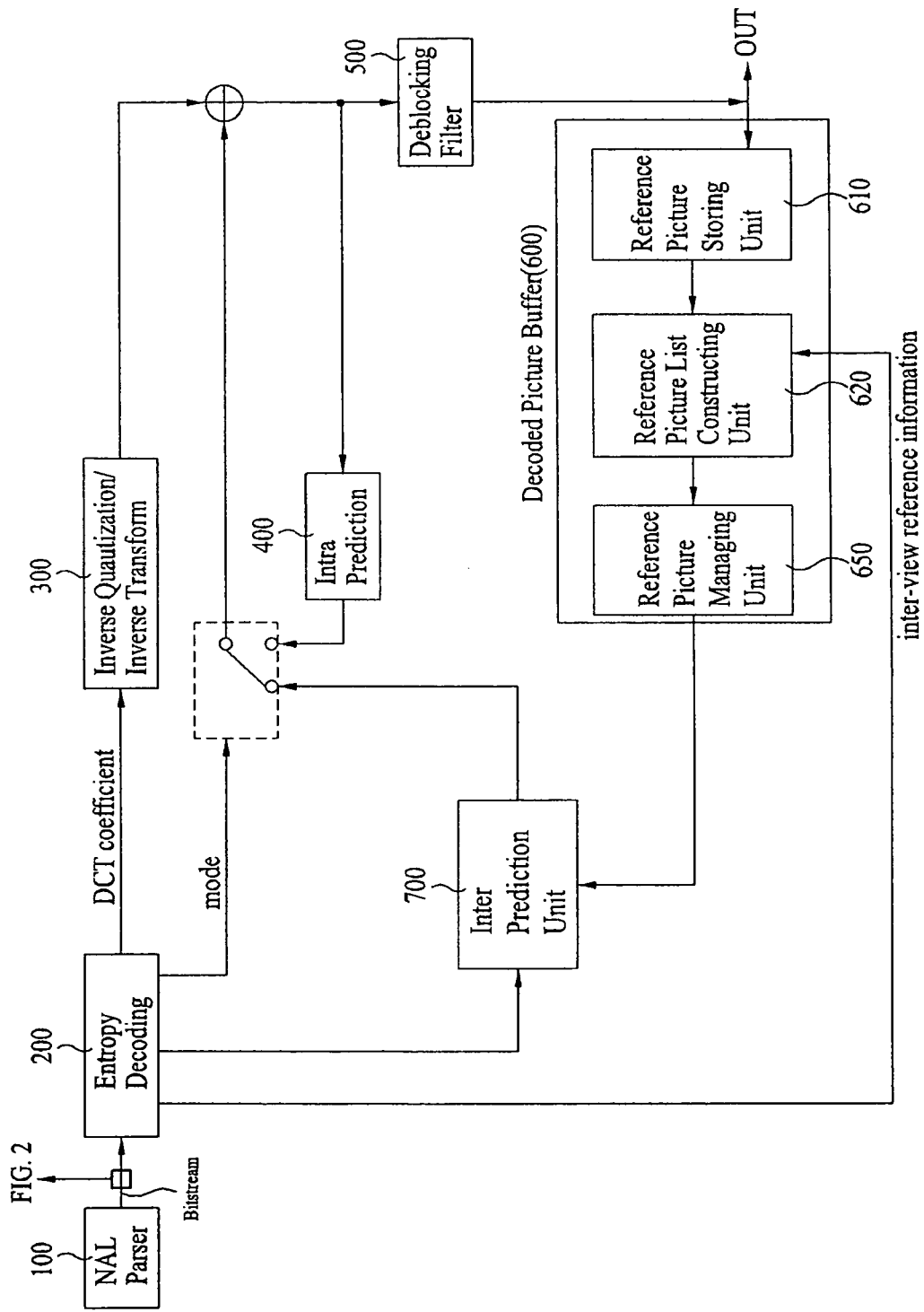
FIG. 1 is a schematic block diagram of a video signal decoding apparatus according to the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of decoding a video signal according to the present invention includes obtaining identification information indicating whether a coded picture of a current NAL unit is an inter-view picture group, obtaining inter-view reference information of the inter-view picture group, and constructing a reference picture list for inter-view prediction using the inter-view reference information according to the identification information, wherein the inter-view reference information includes view identification information of an inter-view reference picture.

In a method of decoding a video signal including obtaining identification information indicating whether a coded picture of a current NAL unit is an inter-view picture group, obtaining inter-view reference information of the inter-view picture group, and constructing a reference picture list for inter-view prediction using the inter-view reference information according to the identification information, wherein the inter-view reference information includes view identification information of an inter-view reference picture, the video signal is characterized in being received as a broadcast signal.

In a method of decoding a video signal including obtaining identification information indicating whether a coded picture of a current NAL unit is an inter-view picture group, obtaining inter-view reference information of the inter-view picture group, and constructing a reference picture list for inter-view prediction using the inter-view reference information according to the identification information, wherein the inter-view reference information includes view identification information of an inter-view reference picture, the video signal is characterized in being received via a digital medium.

To further achieve these and other advantages and in accordance with the purpose of the present invention, a medium, in which a program for executing a method of decoding a video signal including obtaining identification information indicating whether a coded picture of a current NAL unit is an inter-view picture group, obtaining inter-view reference information of the inter-view picture group, and constructing a reference picture list for inter-view prediction using the inter-view reference information according to the identification information, wherein the inter-view reference information includes view identification information of an inter-view reference picture is recorded, is configured to be read by a computer.

To further achieve these and other advantages and in accordance with the purpose of the present invention, an apparatus for decoding a video signal includes a variable deriving unit obtaining identification information indicating whether a coded picture of a current NAL unit is an inter-view picture group and inter-view reference information of the inter-view picture group and a reference picture list constructing unit constructing a reference picture list for inter-view prediction using the inter-view reference information according to the identification information, wherein the inter-view reference information includes view identification information of an inter-view reference picture.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings.

First of all, compression coding of video signal data considers spatial redundancy, spatial redundancy, scalable redundancy, and inter-view redundancy. And, compression coding is enabled by considering inter-view existing mutual redundancy in the course of the compression coding. Compression coding scheme, which takes inter-view redundancy into consideration, is just an embodiment of the present invention. And, the technical idea of the present invention is applicable to temporal redundancy, scalable redundancy, and the like.

In the present disclosure, coding can include both concepts of encoding and decoding. And, coding can be flexibly interpreted to correspond to the technical idea and scope of the present invention.

Looking into a configuration of a bit stream in H.264/AVC, there exists a separate layer structure called a NAL (network abstraction layer) between a VCL (video coding layer) dealing with a moving picture encoding process itself and a lower system that transports and stores encoded information. An output from an encoding process is VCL data and is mapped by NAL unit prior to transport or storage. Each NAL unit includes compressed video data or RBSP (raw byte sequence payload: result data of moving picture compression) that is the data corresponding to header information.

The NAL unit basically includes a NAL header and an RBSP. The NAL header includes flag information (nal_ref_idc) indicating whether a slice as a reference picture of the NAL unit is included and an identifier (nal_unit_type) indicating a type of the NAL unit. Compressed original data is stored in the RBSP. And, RBSP trailing bit is added to a last portion of the RBSP to represent a length of the RBSP as an 8-bit multiplication. As the type of the NAL unit, there is IDR (instantaneous decoding refresh) picture, SPS (sequence parameter set), PPS (picture parameter set), SEI (supplemental enhancement information), or the like.

In the standardization, restrictions for various profiles and levels are set to enable implementation of a target product with an appropriate cost. In this case, a decoder should meet the restriction decided according the corresponding profile and level. Thus, two concepts, 'profile' and 'level' are defined to indicate a function or parameter for representing how far the decoder can cope with a range of a compressed sequence. And, a profile indicator (profile_idc) can identify that a bit stream is based on a prescribed profile. The profile indicator means a flag indicating a profile on which a bit stream is based. For instance, in H.264/AVC, if a profile indicator is 66, it means that a bit stream is based on a baseline profile. If a profile indicator is 77, it means that a bit stream is based on a main profile. If a profile indicator is 88, it means that a bit stream is based on an extended profile. And, the profile identifier can be included in a sequence parameter set.

So, in order to deal with a multi-view video, it needs to be identified whether a profile of an inputted bit stream is a multi-view profile. If the profile of the inputted bit stream is the multi-view profile, it is necessary to add syntax to enable at least one additional information for multi-view to be transmitted. In this case, the multi-view profile indicates a profile mode handling multi-view video as an amendment technique of H.264/AVC. In MVC, it may be more efficient to add syntax as additional information for an MVC mode rather than unconditional syntax. For instance, when a profile indicator of AVC indicates a multi-view profile, if information for a multi-view video is added, it is able to enhance encoding efficiency.

A sequence parameter set indicates header information containing information crossing over coding of an overall sequence such as a profile, a level, and the like. A whole compressed moving picture, i.e., a sequence should begin at a sequence header. So, a sequence parameter set corresponding to header information should arrive at a decoder before data referring to the parameter set arrives. Namely, the sequence parameter set RBSP plays a role as the header information for the result data of the moving picture compression. Once a bit stream is inputted, a profile indicator preferentially identifies that the inputted bit stream is based on which one of a plurality of profiled. So, by adding a part for deciding whether an inputted bit stream relates to a multi-view profile (e.g., 'If (profile_idc==MULTI_VIEW_PROFILE)') to syntax, it is decided whether the inputted bit stream relates to the multi-view profile. Various kinds of configuration information can be added only if the inputted bit stream is approved as relating to the multi-view profile.

For instance, it is able to add a number of total views, a number of inter-view reference pictures, a view identification number of an inter-view reference picture, and the like. And, a decoded picture buffer can use various kinds of informations on an inter-view reference picture to construct and manage a reference picture list. This will be explained in detail with reference to FIGS. 5 to 10.

FIG. 1 is a schematic block diagram of an apparatus for decoding a video signal according to the present invention.

Referring to FIG. 1, an apparatus for decoding a video signal according to the present invention includes a NAL parser 100, an entropy decoding unit 200, an inverse quantization/inverse transform unit 300, an intra-prediction unit 400, a deblocking filter unit 500, a decoded picture buffer unit 600, an inter-prediction unit 700, and the like.

The decoded picture buffer unit 600 includes a reference picture storing unit 610, a reference picture list constructing unit 620, a reference picture managing unit 650, and the like. And, the reference picture list constructing unit 620 includes a variable deriving unit 625, a reference picture list initializing unit 630, and a reference picture list modifying unit 640.

The NAL parser 100 carries out parsing by NAL unit to decode a received video sequence. In general, at least one sequence parameter set and at least one picture parameter set are transferred to a decoder before a slice header and slice data are decoded. In this case, various kinds of configuration informations can be included in a NAL header area or an extension area of a NAL header. Since MVC is an amendment technique for a conventional AVC technique, it may be more efficient to add the configuration informations in case of an MVC bit stream only rather than unconditional addition. For instance, it is able to add flag information for identifying a presence or non-presence of an MVC bit stream in the NAL header area or the extension area of the NAL header. Only if an inputted bit stream is a multi-view video coded bit stream according to the flag information, it is able to add configuration informations for a multi-view video.

For instance, the configuration informations can include view identification information, inter-view picture group identification information, inter-view prediction flag information, temporal level information, priority identification information, identification information indicating whether it is an instantaneous decoded picture for a view, and the like. They are explained in detail with reference to FIG. 2.

Figure 2:
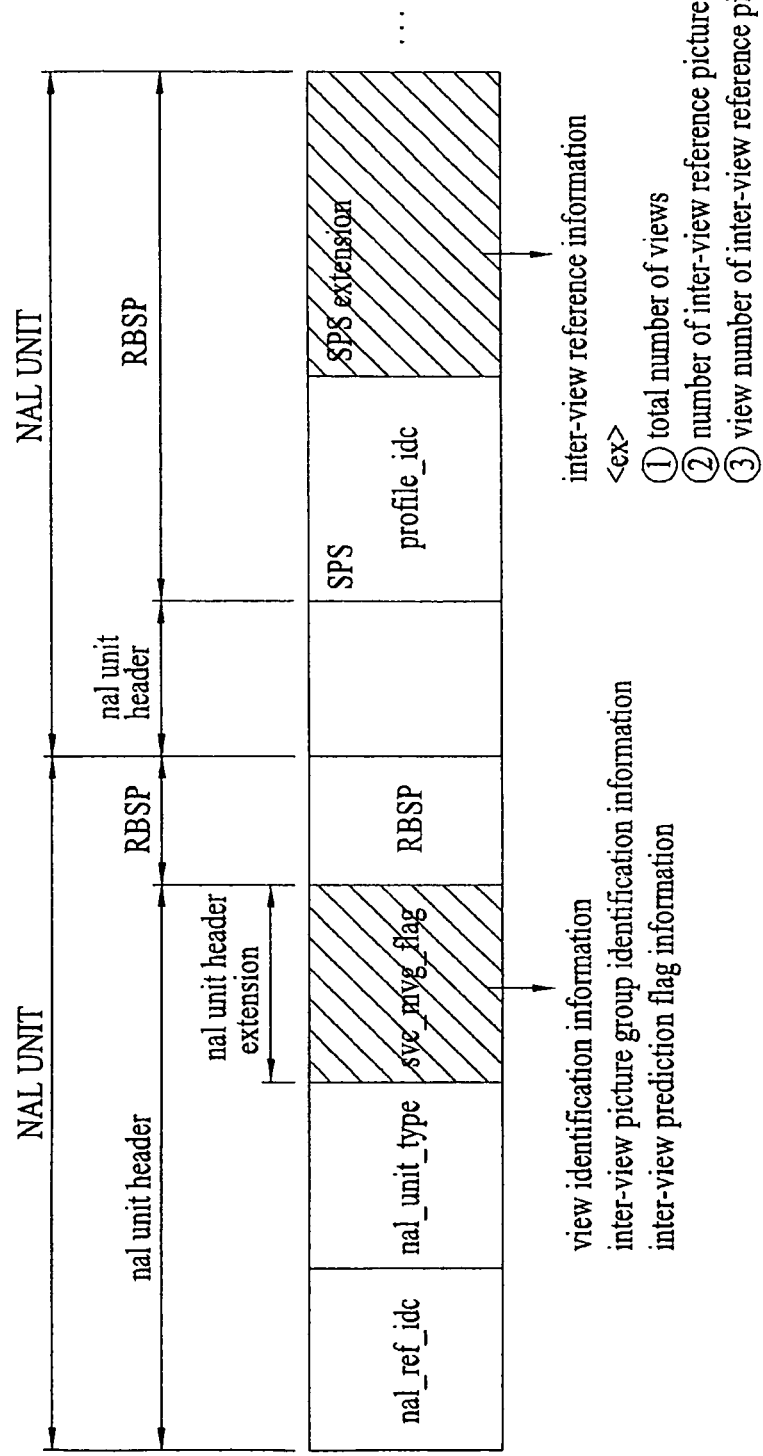
FIG. 2 is a diagram of configuration informations on a multi-view sequence that can be added to a multi-view sequence coded bit stream according to one embodiment of the present invention.

FIG. 2 is a diagram of configuration informations for a multi-view sequence addable to a multi-view sequence coded bit stream according to one embodiment of the present invention.

FIG. 2 shows an example of a NAL-unit structure to which configuration informations for a multi-view sequence can be added. NAL unit can mainly include NAL unit header and RBSP (raw byte sequence payload: result data of moving picture compression).

The NAL unit header can include identification information (nal_ref_idc) indicating whether the NAL unit includes a slice of a reference picture and information (nal_unit_type) indicating a type of the NAL unit.

And, an extension area of the NAL unit header can be conditionally included.

For instance, if the information indicating the type of the NAL unit is associated with scalable video coding or indicates a prefix NAL unit, the NAL unit is able to include an extension area of the NAL unit header. In particular, if the nal_unit_type=20 or 14, the NAL unit is able to include the extension area of the NAL unit header. And, configuration informations for a multi-view sequence can be added to the extension area of the NAL unit header according to flag information (svc_mvc_flag) capable of identifying whether it is MVC bit stream.

For another instance, if the information indicating the type of the NAL unit is information indicating a sequence parameter set, the RBSP can include information on the sequence parameter set. In particular, if nal_unit_type=7, the RBSP can include information for a sequence parameter set. In this case, the sequence parameter set can include an extension area of the sequence parameter set according to profile information. For example, if profile information (profile_idc) is a profile relevant to multi-view video coding, the sequence parameter set can include an extension area of the sequence parameter set. Alternatively, a subset sequence parameter set can include an extension area of a sequence parameter set according to profile information. The extension area of the sequence parameter set can include inter-view reference information indicating inter-view dependency.

Various configuration informations on a multi-view sequence, e.g., configuration informations that can be included in an extension area of NAL unit header or configuration informations that can be included in an extension area of a sequence parameter set are explained in detail as follows.

First of all, view identification information means information for distinguishing a picture in a current view from a picture in a different view. In coding a video sequence signal, POC (picture order count) and 'frame_num' are used to identify each picture. In case of a multi-view video sequence, inter-view prediction is carried out. So, identification information to discriminate a picture in a current view from a picture in another view is needed. Thus, it is necessary to define view identification information for identifying a view of a picture. The view identification information can be obtained from a header area of a video signal. For instance, the header area can be a NAL header area, an extension area of a NAL header, or a slice header area. Information on a picture in a view different from that of a current picture is obtained using the view identification information and it is able to decode the video signal using the information on the picture in the different view.

The view identification information is applicable to an overall encoding/decoding process of the video signal. For instance, view identification information can be used to indicate inter-view dependency. Number information of reference picture, view identification information of an inter-view reference picture and the like may be needed to indicate the inter-view dependency. Like the number information of the inter-view reference picture and the view identification information of the inter-view reference picture, informations used to indicate the inter-view dependency are called inter-view reference information. In this case, the view identification information can be used to indicate the view identification information of the inter-view reference picture. The inter-view reference picture may mean a reference picture used in performing inter-view prediction on a current picture. And, the view identification information can be intactly applied to multi-view video coding using 'frame_num' that considers a view instead of considering a specific view identifier.

Inter-view picture group identification information means information capable of identifying whether a coded picture of a current NAL unit is an inter-view picture group. In this case, the inter-view picture group means a coded picture in which all slices reference only slices with the same picture order count. For instance, it means a coded picture that refers to a slice in a different view only but does not refer to a slice in a current view. In decoding a multi-view sequence, an inter-view random access is possible. For inter-view prediction, inter-view reference information is necessary. In obtaining the inter-view reference information, inter-view picture group identification information is usable. For instance, if a current picture corresponds to an inter-view picture group, inter-view reference information on the inter-view picture group can be obtained. If a current picture corresponds to a non-inter-view picture group, inter-view reference information on the non-inter-view picture group can be obtained. This will be explained in detail with reference to FIGS. 5 to 10.

Thus, in case that inter-view reference information is obtained based on inter-view picture group identification information, it is able to perform inter-view random access more efficiently. This is because inter-view reference relation between pictures in an inter-view picture group can differ from that in a non-inter-view picture group. And, in case of an inter-view picture group, pictures in a plurality of views can be referred to. For instance, a picture of a virtual view is generated from pictures in a plurality of views and it is then able to predict a current picture using the picture of the virtual view.

In constructing a reference picture list, the inter-view picture group identification information can be used. In this case, the reference picture list can include a reference picture list for inter-view prediction. And, the reference picture list for the inter-view prediction can be added to the reference picture list. For instance, in case of initializing a reference picture list or modifying the reference picture list, the inter-view picture group identification information can be used. And, it can be also used to manage the added reference pictures for the inter-view prediction. For instance, by dividing the reference pictures into an inter-view picture group and a non-inter-view picture group, it is able to mark a representation indicating that reference pictures failing to be used in performing inter-view prediction shall not be used. And, the inter-view picture group identification information is applicable to a hypothetical reference decoder. This will be explained in detail with reference to FIGS. 5 to 10.

Inter-view prediction flag information means information indicating whether a coded picture of a current NAL unit is used for inter-view prediction. The inter-view prediction flag information is usable for a part where temporal prediction or inter-view prediction is performed. In this case, identification information indicating whether NAL unit includes a slice of a reference picture can be used together. For instance, although a current NAL unit fails to include a slice of a reference picture according to the identification information, if it is used for inter-view prediction, the current NAL unit can be a reference picture used for only an inter-view prediction. According to the identification information, if a current NAL unit includes a slice of a reference picture and used for inter-view prediction, the current NAL unit can be used for temporal prediction and inter-view prediction. Although NAL unit fails to include a slice of a reference picture according to the identification information, it can be stored in a decoded picture buffer. This is because, in case that a coded picture of a current NAL unit is used for inter-view prediction according to the inter-view prediction flag information, it needs to be stored.

Aside from a case of using both of the flag information and the identification information together, one identification information can indicate whether a coded picture of a current NAL unit is used for temporal prediction or/and inter-view prediction.

And, the inter-view prediction information can be used for a single loop decoding process. In case that a coded picture of a current NAL unit is not used for inter-view prediction according to the inter-view prediction flag information, decoding can be performed in part. For instance, intra-macroblock is completely decoded, whereas inter-macroblock is partially decoded for only a residual information. Hence, it is able to reduce complexity of a decoder. This can be efficient if it is unnecessary to reconstruct a sequence by specifically performing motion compensation in different views when a user is looking at a sequence in a specific view only without viewing a sequence in all views.

Figure 4:
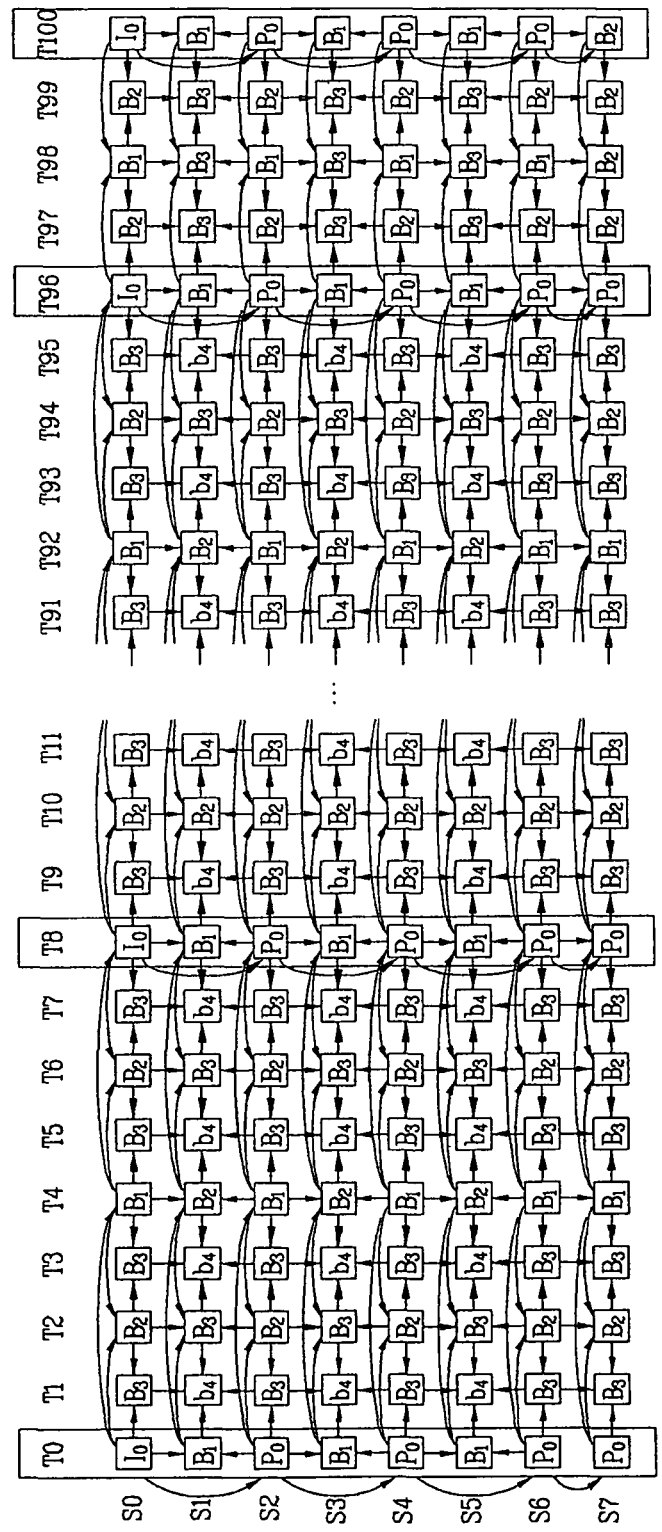
FIG. 4 is a diagram of an overall prediction structure of a multi-view sequence signal according to one embodiment of the present invention to explain a concept of an inter-view picture group.

The diagram shown in FIG. 4 is used to explain one embodiment of the present invention.

For instance, a coding order may correspond to S0, S2 and S1 in considering a portion of the diagram shown in FIG. 4. Let's assume that a picture to be currently coded is a picture $B_3$ on a time zone T2 in a view S1. In this case, a picture $B_2$ on the time zone T2 in a view S0 and a picture $B_2$ on the time zone T2 in a view S2 can be used for inter-view prediction. If the picture $B_2$ on the time zone T2 in the view S0 is used for the inter-view prediction, the inter-view prediction flag information can be set to 1. If the picture $B_2$ on the time zone T2 in the view S0 is not used for the inter-view prediction, the flag information can be set to 0. In this case, if inter-view prediction flag information of all slices in the view S0 is 0, it may be unnecessary to decode the all slices in the view S0. Hence, coding efficiency can be enhanced.

For another instance, if inter-view prediction flag information of all slices in the view S0 is not 0, i.e., if at least one slice is set to 1, a slice set to 0 should be decoded even if the slice is set to 0. Since the picture $B_2$ on the time zone T2 in the view S0 is not used for decoding of a current picture, assuming that decoding is not executed by setting the inter-view prediction information to 0, it is unable to reconstruct a picture $B_3$ on the time zone T1 in the view S0, which refers to the picture $B_2$ on the time zone T2 in the view S0, and a picture $B_3$ on a time zone T3 in the view S0 in case of decoding slices in the view S0. Hence, slices set to 0 should be reconstructed regardless of the inter-view prediction flag information.

For further instance, the inter-view prediction flag information is usable for a decoded picture buffer (DPB). For example, if the inter-view prediction flag information is not provided, the picture $B_2$ on the time zone T2 in the view S0 should be unconditionally stored in the decoded picture buffer. Yet, if it is able to know that the inter-view prediction flag information is 0, the picture $B_2$ on the time zone T2 in the view S0 may not be stored in the decoded picture buffer. Hence, it is able to save a memory of the decoded picture buffer.

Temporal level information means information on a hierarchical structure to provide temporal scalability from a video signal. Though the temporal level information, it is able to provide a user with a sequence on various time zones.

Priority identification information means information capable of identifying a priority of NAL unit. It is able to provide view scalability using the priority identification information. For examples, it is able to define view level information using the priority identification information. In this case, view level information means information on a hierarchical structure for providing view scalability from a video signal.

In a multi-view video sequence, it is necessary to define a level for a time and a level for a view to provide a user with various temporal and view sequences. In case of defining the above level information, it is able to use temporal scalability and view scalability. Hence, a user is able to view a sequence at a specific time and view only or a sequence according to another condition for restriction only.

The level information can be set in various ways according to its referential condition. For instance, the level information can be set different according to camera location or camera alignment. And, the level information can be determined by considering inter-view reference information. For instance, a level for a view of which an inter-view picture group is an I picture is set to 0, a level for a view of which an inter-view picture group is a P picture is set to 1, and a level for a view of which an inter-view picture group is a B picture is set to 2. Thus, the level value can be assigned to the priority identification information. Moreover, the level information can be arbitrarily set not based on a special reference.

Meanwhile, the entropy decoding unit 200 carries out entropy decoding on a parsed bit stream, and a coefficient of each macroblock, a motion vector, and the like are then extracted. The inverse quantization/inverse transform unit 300 obtains a transformed coefficient value by multiplying a received quantized value by a constant and then transforms the coefficient value inversely to reconstruct a pixel value. Using the reconstructed pixel value, the intra-prediction unit 400 performs an intra prediction from a decoded sample within a current picture. Meanwhile, the deblocking filter unit 500 is applied to each coded macroblock to reduce, block distortion. A filter smoothens a block edge to enhance an image quality of a decoded frame. A selection of a filtering process depends on boundary strength and gradient of an image sample around a boundary. Pictures through filtering are outputted or stored in the decoded picture buffer unit 600 to be used as reference pictures.

The decoded picture buffer unit 600 plays a role in storing or opening the previously coded pictures to perform an inter prediction. In this case, to store the pictures in the decoded picture buffer unit 600 or to open the pictures, 'frame_num' and POC (picture order count) of each picture are used. So, since there exist pictures in a view different from that of a current picture among the previously coded pictures, view information for identifying a view of a picture may be usable together with the 'frame_num' and the POC. The decoded picture buffer unit 600 includes the reference picture storing unit 610, the reference picture list constructing unit 620, and the reference picture managing unit 650. The reference picture storing unit 610 stores pictures that will be referred to for the coding of the current picture. The reference picture list constructing unit 620 constructs a list of reference pictures for the inter-picture prediction. In multi-view video coding, inter-view prediction may be needed. So, if a current picture refers to a picture in another view, it may be necessary to construct a reference picture list for the inter-view prediction.

Moreover, it is able to construct a reference picture list for performing both temporal prediction and inter-view prediction. For instance, if a current picture refers to a picture in a diagonal direction, it is able to construct a reference picture list in the diagonal direction. In this case, there are various methods for constructing the reference picture list in the diagonal direction. For example, it is able to define information (ref_list_idc) for identifying a reference picture list. If ref_list_idc=0, it means a reference picture list for temporal prediction. If it is 1, it indicates a reference picture list for inter-view prediction. If it is 2, it can indicate a reference picture list for both temporal prediction and inter-view prediction.

The reference picture list in the diagonal direction can be constructed using the reference picture list for the temporal prediction or the reference picture list for the inter-view prediction. For instance, it is able to add reference pictures in a diagonal direction to a reference picture list for temporal prediction. Alternatively, it is able to add reference pictures in a diagonal direction to a reference picture list for inter-view prediction. Like this, if lists in various directions are constructed, more efficient coding is possible. In the present disclosure, the reference picture list for the temporal prediction and the reference picture list for the inter-view prediction are mainly described. And, the concept of the present invention is applicable to a reference picture list in a diagonal direction as well.

The reference picture list constructing unit 620 can use view information in constructing the reference picture list for the inter-view prediction. For instance, inter-view reference information can be used. Inter-view reference information means information used to indicate an inter-view dependency. For instance, there can be a number of total views, a view identification number, a number of inter-view reference pictures, a view identification number of an inter-view reference picture, and the like. This will be explained in detail with reference to FIG. 4.

Figure 3:
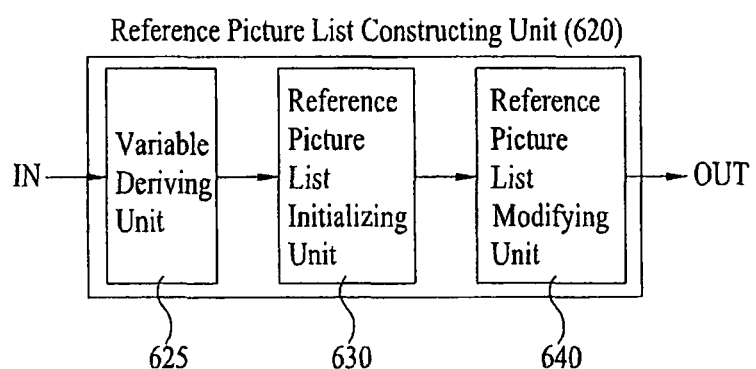
FIG. 3 is a block diagram of a reference picture list constructing unit 620 according to one embodiment of the present invention.

FIG. 3 is an internal block diagram of a reference picture list constructing unit 620 according to an embodiment of the present invention.

The reference picture list constructing unit 620 includes the variable deriving unit 625, the reference picture list initializing unit 630, and the reference list modifying unit 640.

The variable deriving unit 625 derives variables used for reference picture list initialization. For instance, the variable can be derived using 'frame_num' indicating a picture identification number. In particular, variables FrameNum and FrameNumWrap may be usable for each short-term reference picture. First of all, the variable FrameNum is equal to a value of a syntax element frame_num. The variable FrameNumWrap can be used for the decoded picture buffer unit 600 to assign a small number to each reference picture. And, the variable FrameNumWrap can be derived from the variable FrameNum. So, it is able to derive a variable PicNum using the derived variable FrameNumWrap. In this case, the variable PicNum can mean an identification number of a picture used by the decoded picture buffer unit 600. In case of indicating a long-term reference picture, a variable LongTermPicNum can be usable.

In order to construct a reference picture list for inter-view prediction, it is able to derive a first variable (e.g., ViewNum) to construct a reference picture list for inter-view prediction using the inter-view reference information. For instance, it is able to derive a second variable (e.g., ViewId) using 'view_id' for identifying a view of a picture. First of all, the second variable can be equal to a value of the syntax element 'view_id'. And, a third variable (e.g., ViewIdWrap) can be used for the decoded picture buffer unit 600 to assign a small view identification number to each reference picture and can be derived from the second variable. In this case, the first variable ViewNum can mean a view identification number of inter-view reference picture used by the decoded picture buffer unit 600. Yet, since a number of reference pictures used for inter-view prediction in multi-view video coding may be relatively smaller than that used for temporal prediction, it may not define another variable to indicate a view identification number of a long-term reference picture.

The reference picture list initializing unit 630 initializes a reference picture list using the above-mentioned variables. In this case, an initialization process for the reference picture list may differ according to a slice type. For instance, in case of decoding a P-slice, it is able to assign a reference index based on a decoding order. In case of decoding a B-slice, it is able to assign a reference index based on a picture output order. In case of initializing a reference picture list for inter-view prediction, it is able to assign an index to a reference picture based on the first variable, i.e., the variable derived from view identification information of inter-view reference picture. In this case, the reference picture list can be constructed in a manner of discriminating an inter-view reference picture group and a non-inter-view reference picture group from each other.

The reference picture list modifying unit 640 plays a role in enhancing a compression efficiency by assigning a smaller index to a picture frequently referred to in the initialized reference picture list. This is because a small bit is assigned if a reference index for encoding gets smaller. In this case, in order to modify a reference picture list for inter-view prediction, inter-view reference information can be used. For instance, number information of inter-view reference picture can be used in the course of modifying the reference picture list. This will be explained in detail with reference to FIG. 5, and FIG. 8~FIG. 10.

And, the reference picture list modifying unit 640 includes a slice type checking unit 642, a reference picture list-0 modifying unit 643, and a reference picture list-1 modifying unit 645. If an initialized reference picture list is inputted, the slice type checking unit 642 checks a type of a slice to be decoded and then decides whether to modify a reference picture list-0 or a reference picture list-1. So, the reference picture list-0/1 reordering unit 643,645 modifies of the reference picture list-0 if the slice type is not an I-slice and also modifies of the reference picture list-1 additionally if the slice type is a B-slice. Thus, after an end of the modifying process, a reference picture list is constructed.

The reference picture list 0/1 modifying unit 643, 645 includes an identification information obtaining unit 643A, 645A and a reference index assignment changing unit 643B, 645B respectively. The identification information obtaining unit 643A,645A received identification information (reordering_of_pic_nums_idc) indicating an assigning method of a reference index if modifying of a reference picture list is carried out according to flag information indicating whether to modify the reference picture list. And, the reference index assignment changing unit 643B,645B modifies the reference picture list by changing an assignment of a reference index according to the identification information.

And, the reference picture list modifying unit 640 is operable by another method. For instance, modifying can be executed by checking a NAL unit type transferred prior to passing through the slice type checking unit 642 and then classifying the NAL unit type into a case of MVC NAL and a case of non-MVC NAL.

The reference picture managing unit 640 manages reference pictures to execute inter prediction more flexibly. For instance, a memory management control operation method and a sliding window method are usable. This is to manage a reference picture memory and a non-reference picture memory by unifying the memories into one memory and realize an efficient memory management with a small memory. In multi-view video coding, since pictures in a view direction have the same picture order count, information for identifying a view of each of the pictures is usable in marking the pictures in a view direction. And, reference pictures managed in the above manner can be used by the inter-prediction unit 700.

The inter-prediction unit 700 carries out inter prediction using reference pictures stored in the decoded picture buffer unit 600. An inter-coded macroblock can be divided into macroblock partitions. And, each of the macroblock partitions can be predicted from one or two reference pictures. The inter-prediction unit 700 compensates for a motion of a current block using informations transferred from the entropy decoding unit 200. Motion vectors of neighboring blocks of the current block are extracted from a video signal, and then a motion vector predictor of the current block are derived from the motion vectors of the neighboring blocks. And, the motion of the current block is compensated using the derived motion vector predictor and a differential motion vector extracted from the video signal. And, it is able to perform the motion compensation using one reference picture or a plurality of pictures. In multi-view video coding, in case that a current picture refers to pictures in different views, it is able to perform motion compensation using reference picture list information for the inter-view prediction stored in the decoded picture buffer unit 600. And, it is also able to perform motion compensation using vie information for identifying a view of the reference picture. A direct mode is an coding mode for predicting motion information of a current block from motion information for an encoded block. Since this method is able to save a number of bits required for coding the motion information, compression efficiency is enhanced. For instance, a temporal direction mode predicts motion information for a current block using a correlation of motion information in a temporal direction. Using a method similar to this method, the present invention is able to predict motion information for a current block using a correlation of motion information in a view direction.

The inter-predicted or intra-predicted pictures through the above-explained process are selected according to a prediction mode to reconstruct a current picture. In the following description, various embodiments providing an efficient decoding method of a video signal are explained.

FIG. 4 is a diagram of an overall predictive structure of a multi-view video signal according to one embodiment of the present invention to explain a concept of an inter-view picture group.

Referring to FIGS. 4, T0 to T100 on a horizontal axis indicate frames according to time and S0 to S7 on a vertical axis indicate frames according to view. For instance, pictures at T0 mean frames captured by different cameras on the same time zone T0, while pictures at S0 mean sequences captured by a single camera on different time zones. And, arrows in the drawing indicate predictive directions and predictive orders of the respective pictures. For instance, a picture P0 in a view S2 on a time zone T0 is a picture predicted from I0, which becomes a reference picture of a picture P0 in a view S4 on the time zone T0. And, it becomes a reference picture of pictures B1 and B2 on time zones T4 and T2 in the view S2, respectively.

In a multi-view video decoding process, an inter-view random access may be needed. So, an access to a random view should be possible by minimizing the decoding effort. In this case, a concept of an inter-view picture group may be needed to realize an efficient access. The definition of the inter-view picture group was mentioned in FIG. 2. For instance, in FIG. 6, if a picture I0 in a view S0 on a time zone T0 is an inter-view picture group, all pictures in different views on the same time zone, i.e., the time zone T0, become inter-view picture groups. For another instance, if a picture I0 in a view S0 on a time zone T8 is an inter-view picture group, all pictures in different views on the same time zone, i.e., the time zone T8, are inter-view picture groups. Likewise, all pictures in T16, . . . , T96, and T100 become inter-view picture groups as well.

In an overall predictive structure of MVC, GOP can begin with an I-picture. And, the I-picture is compatible with H.264/AVC. So, all inter-view picture groups compatible with H.264/AVC can always become the I-picture. Yet, in case that the I-pictures are replaced by a P-picture, more efficient coding is enabled. In particular, more efficient coding is enabled using the predictive structure enabling GOP to begin with the P-picture compatible with H.264/AVC.

In this case, if the inter-view picture group is re-defined, all slices become encoded picture capable of referring to not only a slice in a frame on a same time zone but also a slice in the same view on a different time zone. Yet, in case of referring to a slice on a different time zone in a same view, it can be restricted to the inter-view picture group compatible with H.264/AVC only. After the inter-view picture group has been decoded, all of the sequentially coded pictures are decoded from pictures decoded ahead of the inter-view picture group in an output order without inter-prediction.

Considering the overall coding structure of the multi-view video shown in FIG. 4, since inter-view reference information of an inter-view picture group differs from that of a non-inter-view picture group, it is necessary to distinguish the inter-view picture group and the non-inter-view picture group from each other according to the inter-view picture group identification information.

The inter-view reference information means the information capable of recognizing a predictive structure between inter-view pictures. This can be obtained from a data area of a video signal. For instance, it can be obtained from a sequence parameter set area. And, the inter-view reference information can be recognized using the number of reference pictures and view information for the reference pictures. For instance, the number of total views is obtained and the view information for identifying each view can be then obtained based on the number of the total views.

And, number information for interview reference pictures, which indicates a number of reference pictures for a reference direction of each view can be obtained. According to the number information of the inter-view reference pictures, it is able to obtain view identification information of each inter-view reference picture. Through this method, the inter-view reference information can be obtained. And, the inter-view reference information can be obtained in a manner of being categorized into a case of an inter-view picture group and a case of a non-inter-view picture group. This can be known using inter-view picture group identification information indicating whether a coded slice in a current NAL corresponds to an inter-view picture group. The inter-view picture group identification information can be obtained from an extension area of NAL header, or a slice layer.

The inter-view reference information obtained according to the inter-view picture group identification information is usable for construction and modification of a reference picture list. This will be explained in detail with reference to FIGS. 5 to 10.

Figure 5:
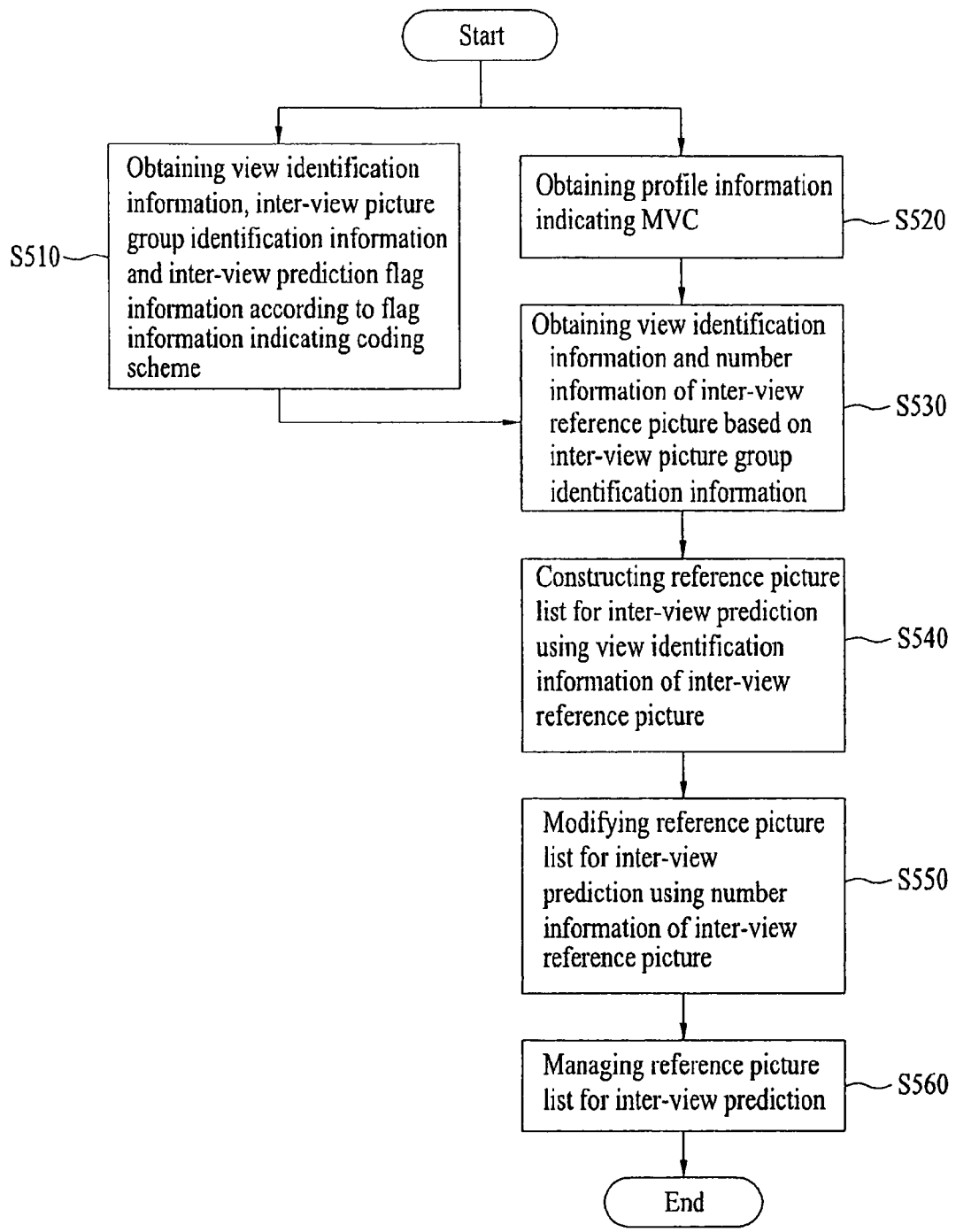
FIG. 5 is a flowchart for constructing and modifying a reference picture list according to one embodiment of the present invention.

FIG. 5 is a flowchart for constructing and modifying a reference picture list according to one embodiment of the present invention.

Flag information indicating coding scheme can be obtained from a header of a received video signal. For instance, the flag information indicating the coding scheme may include flag information indicating scalable video coding scheme or multi-view video coding scheme. The flag information can be obtained from a NAL header or an extension area of NAL header. In case that a bit stream is a multi-view video coded bit stream according to the flag information, configuration informations for multi-view video coding can be obtained from a header. For instance, view identification information, inter-view picture group identification information, inter-view prediction flag information and the like can be obtained (S510). In this case, the configuration informations can be obtained from a NAL header or an extension area of NAL header.

Profile information related to multi-view video coding can be obtained (S520). For instance, the profile information can be obtained from a sequence parameter set. According to the profile information indicating the multi-view video coding, an extension area of the sequence parameter set for the multi-view video coding can exist. Inter-view reference information can be obtained from the extension area of the sequence parameter set. In this case, the inter-view reference information can be obtained based on the inter-view picture group identification information and the inter-view reference information can include view identification information and number information of the inter-view reference picture (S530).

A reference picture list for inter-view prediction can be constructed using the view identification information of the inter-view reference picture (S540).

The reference picture list can be modified using number information of the inter-view reference picture (S550).

The modified reference picture list for the inter-view prediction can be managed by the reference picture managing unit 640 to realize inter-picture prediction more flexibly (S560). For this, an adaptive memory management control operation method and a sliding window method are usable for example.

Detailed embodiments for how a reference picture list is constructed and modified according to a slice type are explained with reference to FIG. 6 and FIG. 7 as follows.

Figure 6:
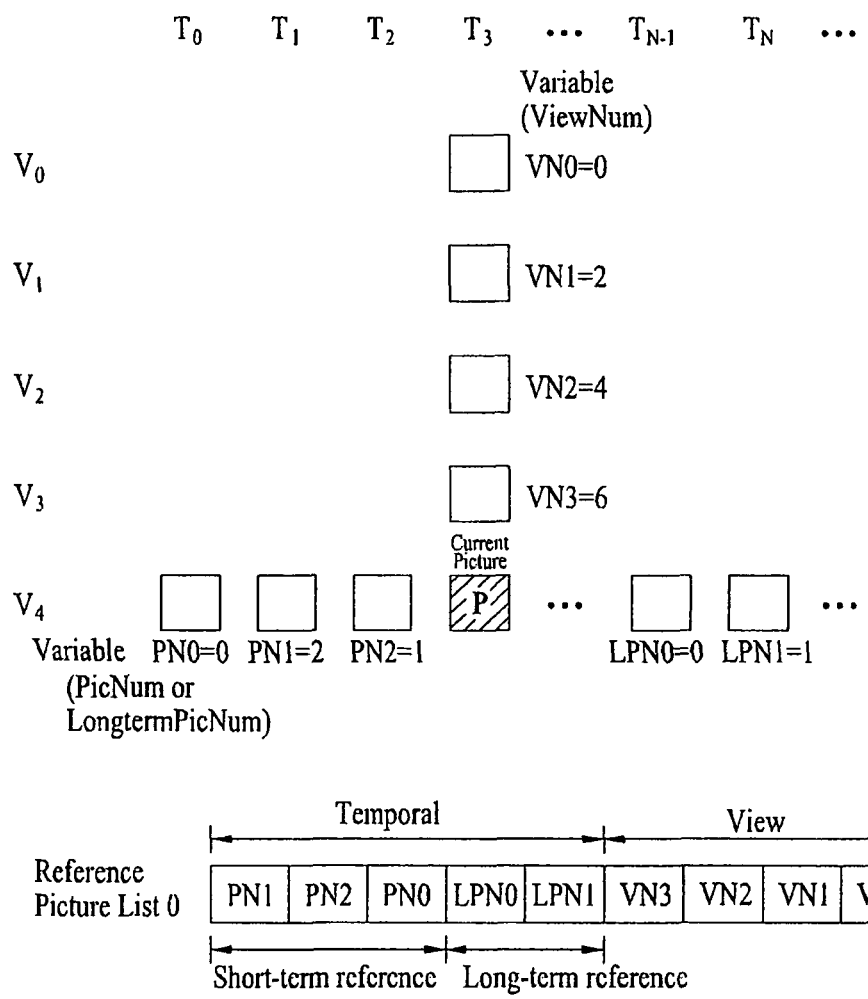
FIG. 6 is a diagram for a method of constructing a reference picture list when a current slice is a slice-P according to one embodiment of the present invention.

FIG. 6 is a diagram to explain a method of constructing a reference picture list when a current slice is a P-slice according to one embodiment of the present invention.

Referring to FIG. 6, a time is indicated by T0, T1, . . . , TN, while a view is indicated by V0, V1, . . . , V4. For instance, a current picture indicates a picture at a time T3 in a view V4. And, a slice type of the current picture is a P-slice. 'PN' is an abbreviation of a variable PicNum, 'LPN' is an abbreviation of a variable LongTermPicNum, and 'VN' is an abbreviation of a variable ViewNum. A numeral attached to an end portion of each of the variables indicates an index indicating a time of each picture (for PN or LPN) or a view of each picture (for VN). This is applicable to FIG. 7 in the same manner.

A reference picture list for temporal prediction or a reference picture list for inter-view prediction can be generated in a different way according to a slice type of a current slice. For instance, a slice type in FIG. 6 is a P/SP slice. In this case, a reference picture list 0 is generated. In particular, the reference picture list 0 can include a reference picture list for temporal prediction and/or a reference picture list for inter-view prediction. In the present embodiment, it is assumed that a reference picture list includes both a reference picture list for temporal prediction and a reference picture list for inter-view prediction.

There are various methods for ordering reference pictures. For instance, reference pictures can be aligned according to in order of decoding or picture output. Alternatively, reference pictures can be aligned based on a variable derived using view information. Alternatively, reference pictures can be aligned according to inter-view reference information indicating an inter-view prediction structure.

In case of a reference picture list for temporal prediction, short-term reference pictures and long-term reference pictures can be aligned based on a decoding order. For instance, they can be aligned according to a value of a variable PicNum or LongTermPicNum derived from a value indicating a picture identification number (e.g., frame_num or Longtermframeidx). First of all, short-term reference pictures can be initialized prior to long-term reference pictures. An order of aligning the short-term reference pictures can be set from a reference picture having a highest value of variable PicNum to a reference picture having a lowest variable value. For instance, the short-term reference pictures can be aligned in order of PN1 having a highest variable, PN2 having an intermediate variable, and PN0 having a lowest variable among PN0 to PN2. An order of aligning the long-term reference pictures can be set from a reference picture having a lowest value of variable LongTermPicNum to a reference picture having a highest variable value. For instance, the long-term reference pictures can be aligned in order of LPN0 having a highest variable and LPN1 having a lowest variable.

In case of a reference picture list for inter-view prediction, reference pictures can be aligned based on a first variable ViewNum derived using view information. In this case, the view information can be inter-view reference information. The inter-view reference information can include view information of an inter-view reference picture. And, the first variable can be derived from the view information of the inter-view reference picture. In particular, reference pictures can be aligned in order of a reference picture having a highest first variable (ViewNum) value to a reference picture having a lowest first variable (ViewNum) value. For instance, in FIG. 6, reference pictures can be aligned in order of VN3 having a highest variable, VN2, VN1, and VN0 having a lowest variable among VN0, VN1, VN2, and VN3.

Thus, both of the reference picture list for the temporal prediction and the reference picture list for the inter-view prediction can be managed as one reference picture list. Alternatively, both of the reference picture list for the temporal prediction and the reference picture list for the inter-view prediction can be managed as separate reference picture lists, respectively. In case of managing both of the reference picture list for the temporal prediction and the reference picture list for the inter-view prediction as one reference picture list, they can be initialized according to an predetermined order or simultaneously. For instance, in case of initializing both of the reference picture list for the temporal prediction and the reference picture list for the inter-view prediction according to an determined order, the reference picture list for the temporal prediction is preferentially initialized and the reference picture list for the inter-view prediction is then initialized in addition.

According to another embodiment, an inter-view reference picture list can be constructed according to inter-view picture group identification information. And, an inter-view reference picture list can be constructed based on an inter-view prediction flag. In this case, construction can include the meaning of initialization. For instance, if a current picture corresponds to an inter-view picture group according to inter-view picture group identification information, an inter-view reference picture list can be constructed using view identification information of an inter-view reference picture corresponding to the inter-view picture group. If a current picture corresponds to a non-inter-view picture group, view identification information of an inter-view reference picture corresponding to the non-inter-view picture group is usable. In this case, the inter-view reference picture or the non-inter-view reference picture can have the same value of information (e.g., picture order count value) indicating a picture output order of the current picture. The inter-view reference picture is usable for inter-view prediction according to an inter-view prediction flag. For instance, if the inter-view prediction flag is 1, a slice of a current NAL can be used the inter-view prediction. So, in order to construct an inter-view reference picture list using the inter-view reference picture, the inter-view prediction flag for the inter-view reference picture should be set to 1.

According to another embodiment, if a current picture corresponds to an inter-view picture group, a temporal reference picture list may not be constructed. In this case, an inter-view reference picture list can be constructed only. This is because inter-view prediction can exist between inter-view picture groups. So, if an inter-view picture group is defined in a different manner, even if a current picture is an inter-view picture group, a temporal reference picture list can be constructed. This is because temporal prediction as well as inter-view prediction can exist between non-inter-view picture groups.

The above-explained embodiments are applicable to FIG. 7 as well. A case that a slice type of a current picture is a B-slice is explained with reference to FIG. 7 as follows.

FIG. 7 is a diagram to explain a method o constructing a reference picture list when a current slice is a B-slice according to one embodiment of the present invention.

Referring to FIG. 7, in case that a slice type is a B-slice, a reference picture list 0 and a reference picture list 1 are generated. In this case, the reference picture list 0 or the reference picture list 1 can include a reference picture list for temporal prediction only or both a reference picture list for temporal prediction and a reference picture list for inter-view prediction. Alternatively, a reference picture list for inter-view prediction can be included only.

In case of the reference picture list for the temporal prediction, a short-term reference picture aligning method may differ from a long-term reference picture aligning method. For instance, in case of short-term reference pictures, reference pictures can be aligned according to a picture order count. In case of long-term reference pictures, reference pictures can be aligned according to a variable (LongtermPicNum) value. And, the short-term reference pictures can be initialized prior to the long-term reference pictures.

In order of aligning short-term reference pictures of the reference picture list 0, reference pictures are preferentially aligned from a reference picture having a highest POC value to a reference picture having a lowest POC value among reference pictures having POC values smaller than that of a current picture, and then aligned from a reference picture having a lowest POC value to a reference picture having a highest POC value among reference pictures having POC values greater than that of the current picture. For instance, reference pictures can be preferentially aligned from PN1 having a highest POC value in reference pictures PN0 and PN1 having POC values smaller than that of a current picture to PN0, and then aligned from PN3 having a lowest POC value in reference pictures PN3 and PN4 having a POC value smaller than that of a current picture to PN4.

In order of aligning long-term reference pictures of the reference picture list 0, reference pictures are aligned from a reference picture having a lowest variable LongtermPicNum to a reference picture having a highest variable. For instance, reference pictures are aligned from LPN0 having a lowest value in LPN0 and LPN1 to LPN1 having a second lowest variable.

In case of the reference picture list for the inter-view prediction, reference pictures can be aligned based on a first variable ViewNum derived using view information. In this case, the view information can be inter-view reference information. The inter-view reference information can include view information of an inter-view reference picture. And, the first variable can be derived from the view information of the inter-view reference picture.

For instance, in case of the reference picture list 0 for the inter-view prediction, reference pictures can be aligned from a reference picture having a highest first variable value among reference pictures having first variable values lower than that of a current picture to a reference picture having a lowest first variable value. The reference pictures are then aligned from a reference picture having a lowest first variable value among reference pictures having first variable values greater than that of the current picture to a reference picture having a highest first variable value. For instance, reference pictures are preferentially aligned from VN1 having a highest first variable value in VN0 and VN1 having first variable values smaller than that of a current picture to VN0 having a lowest first variable value and then aligned from VN3 having a lowest first variable value in VN3 and VN4 having first variable values greater than that of the current picture to VN4 having a highest first variable value.

In case of the reference picture list 1, the above-explained aligning method of the reference list 0 is similarly applicable.

First of all, in case of the reference picture list for the temporal prediction, in order of aligning short-term reference pictures of the reference picture list 1, reference pictures are preferentially aligned from a reference picture having a lowest POC value to a reference picture having a highest POC value among reference pictures having POC values greater than that of a current picture and then aligned from a reference picture having a highest POC value to a reference picture having a lowest POC value among reference pictures having POC values smaller than that of the current picture. For instance, reference pictures can be preferentially aligned from PN3 having a lowest POC value in reference pictures PN3 and PN4 having POC values greater than that of a current picture to PN4 and then aligned from PN1 having a highest POC value in reference pictures PN0 and PN1 having POC values greater than that of the current picture to PN0.

In order of aligning long-term reference pictures of the reference picture list 1, reference pictures are aligned from a reference picture having a lowest variable LongtermPicNum to a reference picture having a highest variable. For instance, reference pictures are aligned from LPN0 having a lowest value in LPN0 and LPN1 to LPN1 having a lowest variable.

In case of the reference picture list for the inter-view prediction, reference pictures can be aligned based on a first variable ViewNum derived using view information. In this case, the view information can be inter-view reference information. The inter-view reference information can include view information of an inter-view reference picture. And, the first variable can be derived from the view information of the inter-view reference picture.

For instance, in case of the reference picture list 1 for the inter-view prediction, reference pictures can be aligned from a reference picture having a lowest first variable value among reference pictures having first variable values greater than that of a current picture to a reference picture having a highest first variable value. The reference pictures are then aligned from a reference picture having a highest first variable value among reference pictures having first variable values smaller than that of the current picture to a reference picture having a lowest first variable value. For instance, reference pictures are preferentially aligned from VN3 having a lowest first variable value in VN3 and VN4 having first variable values greater than that of a current picture to VN4 having a highest first variable value and then aligned from VN1 having a highest first variable value in VN0 and VN1 having first variable values smaller than that of the current picture to VN0 having a lowest first variable value.

The reference picture list initialized by the above process is transferred to the reference picture list modifying unit 640. The initialized reference picture list is then reordered for more efficient coding. The modifying process is to reduce a bit rate by assigning a small number to a reference picture having highest probability in being selected as a reference picture by operating a decoded picture buffer. Various methods of modifying a reference picture list are explained with reference to FIGS. 8 to 10 as follows.

Figure 8:
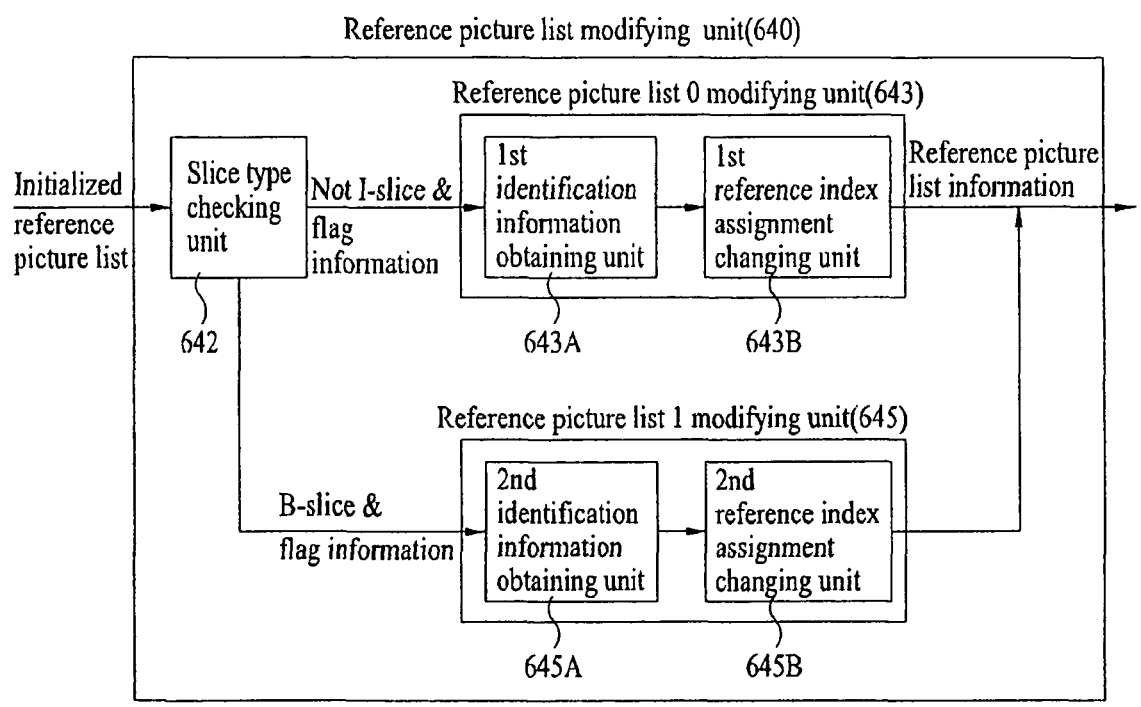
FIG. 8 is a block diagram of a reference picture list modifying unit 640 according to one embodiment of the present invention.

FIG. 8 is an internal block diagram of the reference picture list modifying unit 640 according to one embodiment of the present invention.

Referring to FIG. 8, the reference picture list modifying unit 640 basically includes a slice type checking unit 642, a reference picture list 0 modifying unit 643, and a reference picture list 1 modifying unit 645.

In particular, the reference picture list 0 modifying unit 643 includes a first identification information obtaining unit 643A, and a first reference index assignment changing unit 643B. And, the reference picture list 1 modifying unit 645 includes a second identification obtaining unit 645A and a second reference index assignment changing unit 645B.

The slice type checking unit 642 checks a slice type of a current slice. It is then decided whether to modify a reference picture list 0 and/or a reference picture list 1 according to the slice type. For instance, if a slice type of a current slice is an I-slice, both of the reference picture list 0 and the reference picture list 1 are not modified. If a slice type of a current slice is a P-slice, the reference picture list 0 is modified only. If a slice type of a current slice is a B-slice, both of the reference picture list 0 and the reference picture list 1 are modified.

The reference picture list 0 modifying unit 643 is activated if flag information for modifying the reference picture list 0 is 'true' and if the slice type of the current slice is not the I-slice. The first identification information obtaining unit 643A obtains identification information indicating a reference index assigning method. The first reference index assignment changing unit 643B changes a reference index assigned to each reference picture of the reference picture list 0 according to the identification information.

Likewise, the reference picture list 1 modifying unit 645 is activated if flag information for modifying the reference picture list 1 is 'true' and if the slice type of the current slice is the B-slice. The second identification information obtaining unit 645A obtains identification information indicating a reference index assigning method. The second reference index assignment changing unit 645B changes a reference index assigned to each reference picture of the reference picture list 1 according to the identification information.

So, reference picture list information used for actual inter-prediction is generated through the reference picture list 0 modifying unit 643 and the reference picture list 1 modifying unit 645.

A method of changing a reference index assigned to each reference picture by the first or second reference index assignment changing unit 643B or 645B is explained with reference to FIG. 9 as follows.

Figure 9:
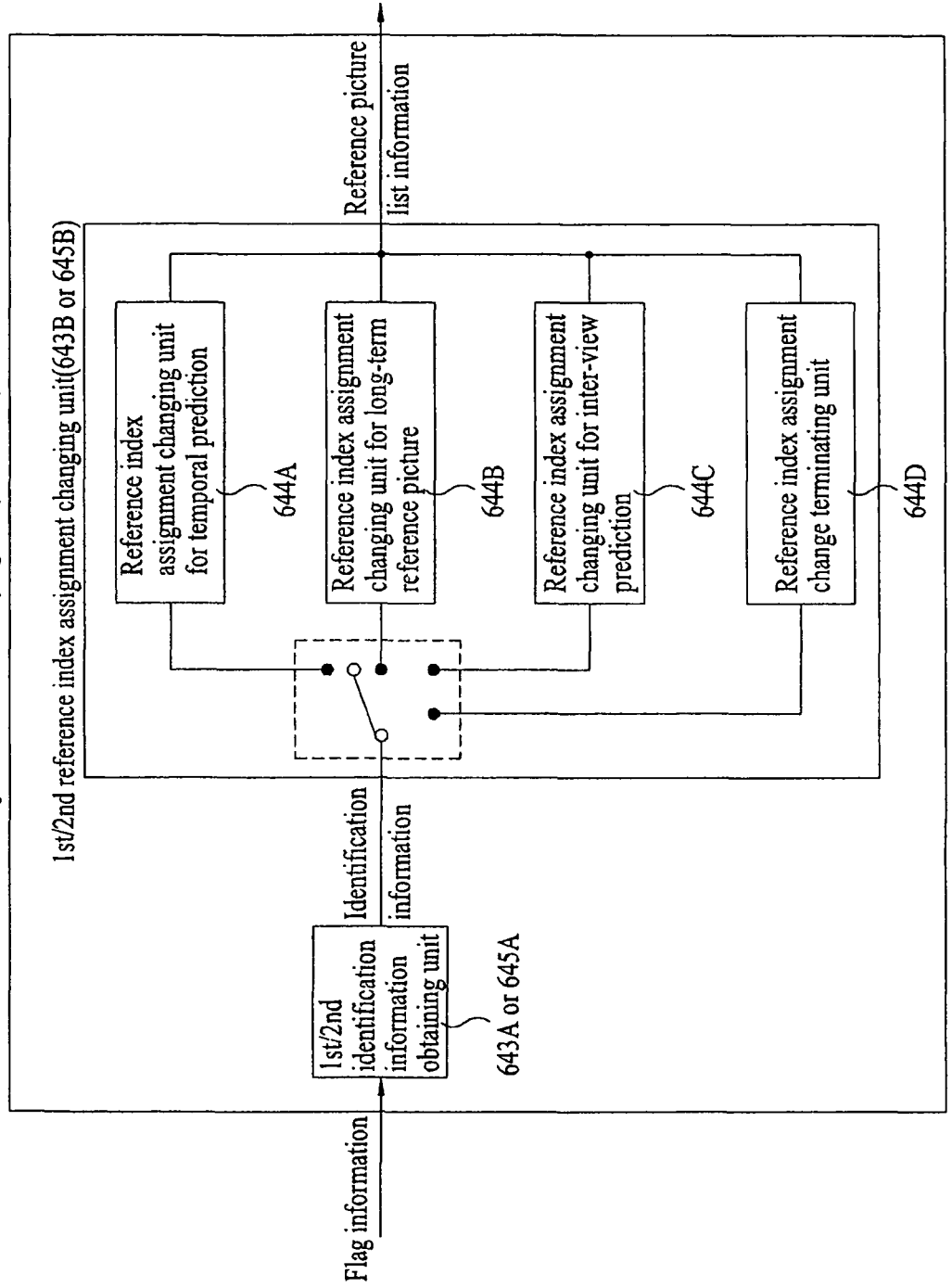
FIG. 9 is a block diagram of a reference number assignment changing unit 643B/645B according to one embodiment of the present invention.

FIG. 9 is an internal block diagram of a reference index assignment changing unit 643B or 645B according to one embodiment of the present invention. In the following description, the reference picture list 0 modifying unit 643 and the reference picture list 1 modifying unit 645 shown in FIG. 8 are explained together.

Referring to FIG. 9, each of the first and second reference index assignment changing units 643B and 645B includes a reference index assignment changing unit for temporal prediction 644A, a reference index assignment changing unit for long-term reference picture 644B, a reference index assignment changing unit for inter-view prediction 644C, and a reference index assignment change terminating unit 644D. According to identification informations obtained by the first and second identification information obtaining units 643A and 645A, parts within the first and second reference index assignment changing units 643B and 645B are activated, respectively. And, the modifying process keeps being executed until identification information for terminating the reference index assignment change is inputted.

For instance, if identification information for changing assignment of a reference index for temporal prediction is received from the first or second identification information obtaining unit 643A or 645A, the reference index assignment changing unit for temporal prediction 644A is activated. The reference index assignment changing unit for temporal prediction 644A obtains a picture number difference according to the received identification information. In this case, the picture number difference means a difference between a picture number of a current picture and a predicted picture number. And, the predicted picture number may indicate a number of a reference picture assigned right before. So, it is able to change the assignment of the reference index using the obtained picture number difference. In this case, the picture number difference can be added/subtracted to/from the predicted picture number according to the identification information.

For another instance, if identification information for changing assignment of a reference index to a designated long-term reference picture is received, the reference index assignment changing unit for a long-term reference picture 644B is activated. The reference index assignment changing unit for a long-term reference picture 644B obtains a long-term reference picture number of a designated picture according to the identification number.

For another instance, if identification information for changing assignment of a reference index for inter-view prediction is received, the reference index assignment changing unit for inter-view prediction 644C is activated. The reference index assignment changing unit for inter-view prediction 644C obtains view information difference according to the identification information. In this case, the view information difference means a difference between a view number of a current picture and a predicted view number. And, the predicted view number may indicate a view number of a reference picture assigned right before. So, it is able to change assignment of a reference index using the obtained view information difference. In this case, the view information difference can be added/subtracted to/from the predicted view number according to the identification information.

In changing the reference number assignment, inter-view reference information can be used. The inter-view reference information can include number information of inter-view reference pictures. And, it is able to derive a variable for reference picture list modification from the number information of the inter-view reference pictures. For instance, in modifying a reference picture list for temporal prediction, in case that a difference value of the view information is added or subtracted, it is able to subtract or add the derived variable together. In this case, the derived variable can be a variable indicating the number information of the inter-view reference pictures. Instead, the derived variable can means a maximum value among index values indicating views. If a current picture corresponds to an inter-view picture group according to inter-view picture group identification information, the variable can be derived from number information of inter-view reference pictures corresponding to the inter-view picture group. If a current picture corresponds to a non-inter-view picture group according to inter-view picture group identification information, the variable can be derived from number information of inter-view reference pictures corresponding to the non-inter-view picture group.

The number information of the inter-view reference pictures can be obtained for each view as many as number information of total views. In case of deriving the variable, number information of inter-view reference pictures for a current picture can be used based on current view information.

For another instance, if identification information for terminating a reference index assignment change is received, the reference index assignment change terminating unit 644D is activated. The reference index assignment change terminating unit 644D terminates an assignment change of a reference index according to the received identification information. So, the reference picture list reordering unit 640 generates reference picture list information.

Thus, reference pictures used for inter-view prediction can be managed together with reference pictures used for temporal prediction. Alternatively, reference pictures used for inter-view prediction can be managed separate from reference pictures used for temporal prediction. For this, new informations for managing the reference pictures used for the inter-view prediction may be required. Details of the reference index assignment changing unit for inter-view prediction 644C are explained with reference to FIG. 10 as follows.

Figure 10:
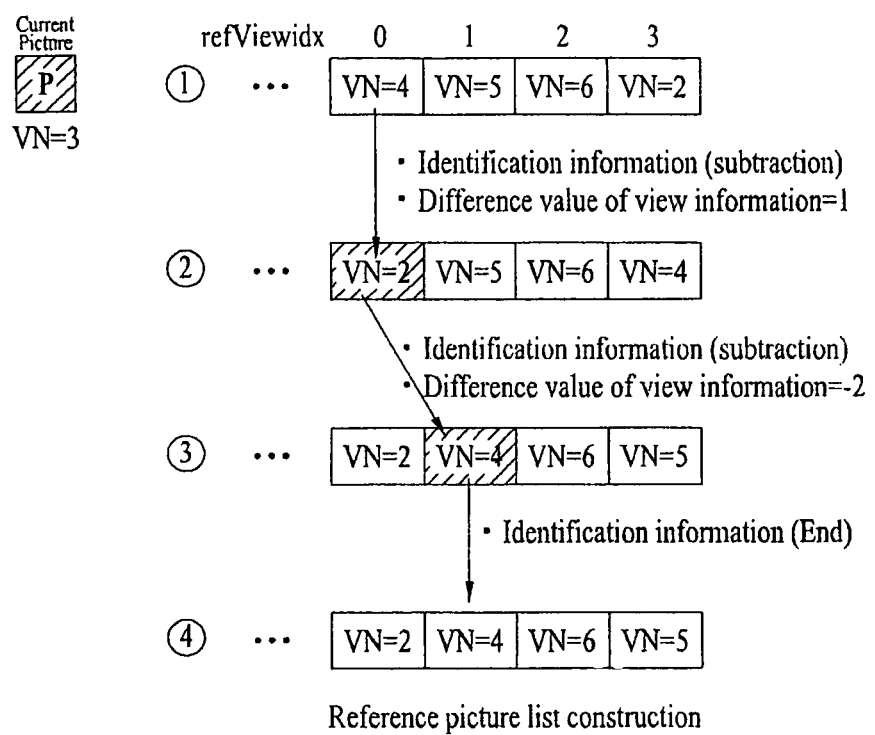
FIG. 10 is a diagram for a process for modifying a reference picture list using view information according to one embodiment of the present invention.

FIG. 10 is a diagram to explain a process for modifying a reference picture list using view information according to one embodiment of the present invention.

Referring to FIG. 10, if a view number VN of a current picture is 3, if a size of a decoded picture buffer DPBsize is 4, and if a slice type of a current slice is a P-slice, a modifying process for a reference picture list 0 is explained as follows.

First of all, an initially predicted view number is '3' that is the view number of the current picture. And, an initial alignment of the reference picture list 0 for inter-view prediction is '4, 5, 6, 2' (①). In this case, if identification information for changing assignment of a reference index for inter-view prediction by subtracting a view information difference is received, '1' is obtained as the view information difference according to the received identification information. A newly predicted view number (=2) is calculated by subtracting the view information difference (=1) from the predicted view number (=3). In particular, a first index of the reference picture list 0 for the inter-view prediction is assigned to a reference picture having the view number 2. And, a picture previously assigned to the first index can be moved to a most rear part of the reference picture list 0. So, the modified reference picture list 0 is '2, 5, 6, 4' (②). Subsequently, if identification information for changing assignment of a reference index for inter-view prediction by subtracting the view information difference is received, '−2' is obtained as the view information difference according to the identification information. A newly predicted view number (=4) is then calculated by subtracting the view information difference (=−2) from the predicted view number (=2). In particular, a second index of the reference picture list 0 for the inter-view prediction is assigned to a reference picture having a view number 4. Hence, the modified reference picture list 0 is '2, 4, 6, 5' (③). Subsequently, if identification information for terminating the reference index assignment change is received, the reference picture list 0 having the modified reference picture list 0 as an end is generated according to the received identification information (④). Hence, the order of the finally generated reference picture list 0 for the inter-view prediction is '2, 4, 6, 5'.

In this case, in the process of adding or subtracting the difference value of the view information, it is able to perform a subtraction or addition operation on the variable value (e.g., number information of inter-view reference pictures, maximum value among index values indicating views, etc.) explained in FIG. 9 according to a predetermined conditional formula. In this case, the predetermined conditional formula may mean a conditional formula to reduce a value, which is considerably big in assigning an index value, into a smaller value.

For another instance of modifying the rest of the pictures after the first index of the reference picture list 0 for the inter-view prediction has been assigned, a picture assigned to each index can be moved to a position right behind that of the corresponding picture. In particular, a second index is assigned to a picture having a view number 4, a third index is assigned to a picture (view number 5) to which the second index was assigned, and a fourth index is assigned to a picture (view number 6) to which the third index was assigned. Hence, the reordered reference picture list 0 becomes '2, 4, 5, 6'. And, a subsequent modifying process can be executed in the same manner.

The reference picture list generated by the above-explained process is used for inter-prediction. Both of the reference picture list for the inter-view prediction and the reference picture list for the temporal prediction can be managed as one reference picture list. Alternatively, each of the reference picture list for the inter-view prediction and the reference picture list for the temporal prediction can be managed as a separate reference picture list.

As mentioned in the foregoing description, the decoding/encoding device, to which the present invention is applied, is provided to a transmitter/receiver for multimedia broadcasting such as DMB (digital multimedia broadcast) to be used in decoding video and data signals and the like. And, the multimedia broadcast transmitter/receiver can include a mobile communication terminal.

A decoding/encoding method, to which the present invention is applied, is configured with a program for computer execution and then stored in a computer-readable recording medium. And, multimedia data having a data structure of the present invention can be stored in computer-readable recording medium. The computer-readable recording media include all kinds of storage devices for storing data that can be read by a computer system. The computer-readable recording media include ROM, RAM, CD-ROM, magnetic tapes, floppy discs, optical data storage devices, etc. and also includes a device implemented with carrier waves (e.g., transmission via internet). And, a bit stream generated by the encoding method is stored in a computer-readable recording medium or transmitted via wire/wireless communication network.

Industrial Applicability

Accordingly, while the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for decoding multi-view video data in a multi-view video stream with a decoding apparatus, comprising:
receiving, with the decoding apparatus, the multi-view video stream, the multi-view video stream including video data for each of a plurality of views, each of the plurality of views corresponding to a different spatial angle, the multi-view video stream including a random access picture, the random access picture including a random access slice, the random access slice referencing only a slice corresponding to a same time and a different view of the random access picture;
obtaining, with the decoding apparatus, identification information representing the multi-view video stream, the multi-view video stream including initialization information of a reference picture list for the random access slice;
obtaining, with the decoding apparatus, the initialization information based on the identification information, the initialization information representing view relationships between the plurality of views, the initialization information including view number information and view identification information for the plurality of views, the view number information indicating a number of reference pictures used for inter-view prediction of the random access picture, the view identification information identifying to which of the plurality of views each of the reference pictures belongs;
initializing, with the decoding apparatus, the reference picture list of the random access slice, the initializing including ordering the reference pictures for the random access picture in the reference picture list, the ordering including assigning an inter-view reference index to each of the reference pictures, the inter-view reference index identifying a reference picture in the reference picture list used for inter-view prediction of a block to be decoded in the random access picture, the assigning being performed using the view number information and the view identification information, the block to be decoded having a same time with the reference pictures and a different view from the reference pictures, the random access picture and at least one of the reference pictures included in the initialized reference picture list having a same picture order count;
deriving, with the decoding apparatus, an adjustment value for adjusting an assignment modification value within a scope of the view number information;
determining, with the decoding apparatus, the assignment modification value for changing the inter-view reference index assigned to the reference picture in the initialized reference picture list according to the adjustment value;

modifying, with the decoding apparatus, the initialized reference picture list for inter-view prediction, the modifying including reordering the reference picture by changing the inter-view reference index assigned to the reference picture based on the determined assignment modification value;

determining, with the decoding apparatus, a prediction value of a macroblock in the random access picture based on the modified reference picture list; and decoding, with the decoding apparatus, the macroblock using the prediction value, wherein the initialization information is obtained from an extension area of a sequence header.

2. The method of claim 1, wherein the multi-view video data includes video data of a base view independent of other views, the base view being a view decoded without using inter-view prediction.

3. The method of claim 1, wherein the identification information is obtained based on NAL(Network Abstract Layer) unit type, the NAL unit type indicating sequence information of the multi-view video data.

4. The method of claim 1, wherein the determined assignment modification value is used to assign the changed inter-view reference index to the reference picture in the initialized reference picture list.

5. The method of claim 4, wherein the modifying step shifts other pictures in the initialized reference picture list to positions later in the initialized reference picture list.

6. An apparatus for decoding multi-view video data in a multi-view video stream, comprising:

a parsing unit configured to receive the multi-view video stream, the multi-view video stream including video data for each of a plurality of views, each of the plurality of views corresponding to a different spatial angle, the multi-view video stream including a random access picture, the random access picture including a random access slice, the random access slice referencing only a slice corresponding to a same time and a different view of the random access picture, the parsing unit configured to obtain identification information representing the multi-view video stream, the multi-view video stream including initialization information of a reference picture list for the random access slice, the parsing unit configured to obtain the initialization information based on the identification information, the initialization information representing view relationships between the plurality of views, the initialization information including view number information and view identification information for the plurality of views, the view number information indicating a number of reference pictures used for inter-view prediction of the random access picture, the view identification information identifying to which of the plurality of views each of the reference pictures belongs;

a reference picture list initializing unit configured to initialize the reference picture list of the random access slice, the initializing including ordering the reference pictures for the random access picture in the reference picture list, the ordering including assigning an inter-view reference index to each of the reference pictures, the inter-view reference index identifying a reference picture in the reference picture list used for inter-view prediction of a block to be decoded in the random access picture, the assigning being performed using the view number information and the view identification information, the block to be decoded having a same time with the reference pictures and a different view from the reference pictures, the random access picture and at least one of the reference pictures included in the initialized reference picture list having a same picture order count;

a reference picture list modifying unit configured to derive an adjustment value for adjusting an assignment modification value within a scope of the view number information, configured to determine the assignment modification value for changing the inter-view reference index assigned to the reference picture in the initialized reference picture list according to the adjustment value, and configured to modify the initialized reference picture list for inter-view prediction, the modifying including reordering the reference picture by changing the inter-view reference index assigned to the reference picture based on the determined assignment modification value; and an inter-prediction unit configured to determine a prediction value of a macroblock in the random access picture based on the modified reference picture list, and configured to decode the macroblock using the prediction value, wherein the initialization information is obtained from an extension area of a sequence header.

7. The apparatus of claim 6, wherein the multi-view video data includes video data of a base view independent of other views, the base view being a view decoded without using inter-view prediction.

8. The apparatus of claim 6, wherein the identification information is obtained based on NAL(Network Abstract Layer) unit type, the NAL unit type indicating sequence information of the multi-view video data.

9. The apparatus of claim 6, wherein the determined assignment modification value is used to assign the changed inter-view reference index to the reference picture in the initialized reference picture list.

10. The apparatus of claim 9, wherein the reference picture list modifying unit is configured to shift other pictures in the initialized reference picture list to positions later in the initialized reference picture list.

* * * * *

UNITED STATES PATENT AND TRADEMARK OFFICE
CERTIFICATE OF CORRECTION

PATENT NO. : 8,711,932 B2  Page 1 of 1
APPLICATION NO. : 12/588471
DATED : April 29, 2014
INVENTOR(S) : Han Suh Koo et al.

It is certified that error appears in the above-identified patent and that said Letters Patent is hereby corrected as shown below:

In the Specification

Column 1, line 5 should read as follows:

CROSS-REFERENCE TO RELATED
APPLICATIONS

This application is a continuation of U.S. Application No. 12/310,103 filed February 11, 2009, which claims priority from PCT International Application No. <u>PCT/KR2007/004115</u> ~~PCT/KR2007/0014115~~ filed on August 27, <u>2007</u>~~2009~~, which claims priority on U.S. provisional application nos. 60/840,032; 60/842,152; 60/842,151; and 60/869,867 filed on August 25, 2006, September 5, 2006, September 5, 2006 and December 13, 2006. The entire contents of all of these applications are incorporated herein by reference.

Signed and Sealed this
Fifth Day of August, 2014

Michelle K. Lee
*Deputy Director of the United States Patent and Trademark Office*